(12) United States Patent
Castaneda et al.

(10) Patent No.: US 9,493,184 B2
(45) Date of Patent: *Nov. 15, 2016

(54) STEER MANEUVERS FOR MATERIALS HANDLING VEHICLES

(71) Applicant: CROWN EQUIPMENT CORPORATION, New Bremen, OH (US)

(72) Inventors: Anthony T. Castaneda, Troy, OH (US); William W. McCroskey, Sidney, OH (US); James F. Schloemer, New Bremen, OH (US); Mark E. Schumacher, New Knoxville, OH (US); Vernon W. Siefring, Covington, OH (US); Timothy A. Wellman, Coldwater, OH (US)

(73) Assignee: Crown Equipment Corporation, New Bremen, OH (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/205,449

(22) Filed: Mar. 12, 2014

(65) Prior Publication Data
US 2014/0195121 A1    Jul. 10, 2014

Related U.S. Application Data

(63) Continuation of application No. 13/033,169, filed on Feb. 23, 2011, now Pat. No. 8,731,777, and a continuation-in-part of application No. 12/649,815, filed on Dec. 30, 2009, now Pat. No. 8,452,464, said (Continued)

(51) Int. Cl.
*B62D 6/00* (2006.01)
*B62D 15/02* (2006.01)

(Continued)

(52) U.S. Cl.
CPC .............. *B62D 6/002* (2013.01); *B62D 6/001* (2013.01); *B62D 15/0265* (2013.01);

(Continued)

(58) Field of Classification Search
CPC .................................. B62D 1/00; G08G 1/16
See application file for complete search history.

(56) References Cited

U.S. PATENT DOCUMENTS 1,835,808 A    12/1931    Pitts
2,959,260 A    11/1960    Johnson et al.

(Continued)

FOREIGN PATENT DOCUMENTS

CN    101005981 A    7/2007
CN    101162395 A    4/2008

(Continued)

OTHER PUBLICATIONS

Office Action and Search Report; Chinese Patent Application No. 201280010186.8; Feb. 6, 2015; State Intellectual Property Office of the People;s Republic of China.

(Continued)

*Primary Examiner* — Tuan C. To
(74) *Attorney, Agent, or Firm* — Stevens & Showalter LLP

(57) ABSTRACT

A materials handling vehicle implements a steer maneuver to hug an object. A controller on the vehicle receives sensor data from at least one sensing device and detects that a selected object is in an environment proximate the vehicle using the received sensor data. The controller performs a steer maneuver by causing the vehicle to steer such that the vehicle is substantially maintained at a desired distance from the selected object as the vehicle travels on a desired heading.

60 Claims, 22 Drawing Sheets

Related U.S. Application Data application No. 13/033,169 is a continuation-in-part of application No. 12/649,815, which is a continuation-in-part of application No. PCT/US2009/066789, filed on Dec. 4, 2009, and a continuation-in-part of application No. 12/631,007, filed on Dec. 4, 2009, application No. 14/205,449, which is a continuation-in-part of application No. PCT/US2009/069833, filed on Dec. 30, 2009, said application No. 13/033,169 is a continuation of application No. PCT/US2009/069833, filed on Dec. 30, 2009, which is a continuation-in-part of application No. PCT/US2009/066789, filed on Dec. 4, 2009, which is a continuation-in-part of application No. 12/631,007.

(60) Provisional application No. 61/234,866, filed on Aug. 18, 2009.

(51) Int. Cl.
  *B66F 9/075* (2006.01)
  *G05D 1/02* (2006.01)
  *G08C 17/02* (2006.01)

(52) U.S. Cl.
  CPC ........ *B66F 9/0755* (2013.01); *B66F 9/07568* (2013.01); *B66F 9/07581* (2013.01); *G05D 1/024* (2013.01); *G05D 1/0255* (2013.01); *G08C 17/02* (2013.01); *G05D 2201/0216* (2013.01); *G08C 2201/20* (2013.01)

(56) References Cited

U.S. PATENT DOCUMENTS

| | | |
|---|---|---|
| 3,016,973 A | 1/1962 | Williamson |
| 3,047,783 A | 7/1962 | Van Oort et al. |
| 3,587,784 A | 6/1971 | Tait |
| 3,825,130 A | 7/1974 | Lapham |
| 3,968,893 A | 7/1976 | Lapham |
| 4,074,120 A | 2/1978 | Allred et al. |
| 4,252,495 A | 2/1981 | Cook |
| 4,258,825 A | 3/1981 | Collins |
| 4,287,966 A | 9/1981 | Frees |
| 4,476,954 A | 10/1984 | Johnson et al. |
| 4,527,651 A | 7/1985 | Thiermann, Sr. |
| 4,546,840 A | 10/1985 | Yukishige et al. |
| 4,551,059 A | 11/1985 | Petoia |
| 4,665,487 A | 5/1987 | Ogawa et al. |
| 4,714,140 A | 12/1987 | Hatton et al. |
| 4,716,980 A | 1/1988 | Butler |
| 4,727,492 A | 2/1988 | Reeve et al. |
| 4,785,664 A | 11/1988 | Reebs |
| 4,878,003 A | 10/1989 | Knepper |
| 4,954,817 A | 9/1990 | Levine |
| 4,967,362 A | 10/1990 | Schutten et al. |
| 5,023,790 A | 6/1991 | Luke, Jr. |
| 5,036,935 A | 8/1991 | Kohara |
| 5,044,472 A | 9/1991 | Dammeyer et al. |
| 5,107,946 A | 4/1992 | Kamimura et al. |
| 5,141,381 A | 8/1992 | Kato et al. |
| 5,170,351 A | 12/1992 | Nemoto et al. |
| 5,245,144 A | 9/1993 | Stammen |
| 5,307,271 A | 4/1994 | Everett, Jr. et al. |
| 5,402,257 A | 3/1995 | Hasselmann et al. |
| 5,502,638 A | 3/1996 | Takenaka |
| 5,652,486 A | 7/1997 | Mueller et al. |
| 5,709,523 A | 1/1998 | Ware |
| 5,778,327 A | 7/1998 | Simmons et al. |
| 5,816,741 A | 10/1998 | Troppman, III |
| 5,892,855 A | 4/1999 | Kakinami et al. |
| 5,913,919 A | 6/1999 | Bauer et al. |
| 5,928,292 A | 7/1999 | Miller et al. |
| 5,938,710 A | 8/1999 | Lanza et al. |
| 5,939,986 A | 8/1999 | Schiffbauer et al. |
| 5,964,313 A | 10/1999 | Guy |
| 6,030,169 A | 2/2000 | Rossow et al. |
| 6,148,255 A * | 11/2000 | van der Lely ....... A01B 69/008 701/466 |
| 6,173,215 B1 | 1/2001 | Sarangapani |
| 6,226,902 B1 | 5/2001 | Heyne |
| 6,276,485 B1 | 8/2001 | Eriksson et al. |
| 6,285,925 B1 | 9/2001 | Steffen |
| 6,382,359 B1 | 5/2002 | Lohmann |
| 6,464,025 B1 | 10/2002 | Koeper et al. |
| 6,548,982 B1 | 4/2003 | Papanikolopoulos et al. |
| 6,595,306 B2 | 7/2003 | Trego et al. |
| 6,686,951 B1 | 2/2004 | Dickson et al. |
| 6,748,292 B2 | 6/2004 | Mountz |
| 6,784,800 B2 | 8/2004 | Orzechowski |
| 6,809,680 B2 | 10/2004 | Tojima |
| 6,810,319 B2 | 10/2004 | Manaka |
| 7,017,689 B2 | 3/2006 | Gilliland et al. |
| 7,047,132 B2 | 5/2006 | Jacobs |
| 7,076,366 B2 | 7/2006 | Simon et al. |
| 7,266,477 B2 | 9/2007 | Foessel |
| 7,610,121 B2 | 10/2009 | Nishira et al. |
| 7,711,464 B2 | 5/2010 | Kaufmann |
| 7,734,419 B2 | 6/2010 | Kondoh |
| 7,765,066 B2 | 7/2010 | Braeuchle et al. |
| 7,860,653 B2 * | 12/2010 | Joe et al. ...................... 701/301 |
| 8,027,029 B2 | 9/2011 | Lu et al. |
| 8,060,400 B2 | 11/2011 | Wellman |
| 8,170,787 B2 | 5/2012 | Coats et al. |
| 8,180,561 B2 | 5/2012 | Osanai |
| 8,195,344 B2 | 6/2012 | Song et al. |
| 8,386,146 B2 | 2/2013 | Shirai |
| 8,705,792 B2 | 4/2014 | James et al. |
| 2001/0035729 A1 | 11/2001 | Graiger et al. |
| 2002/0035331 A1 | 3/2002 | Brockway et al. |
| 2002/0163495 A1 | 11/2002 | Doynov |
| 2002/0178830 A1 | 12/2002 | Kazerooni et al. |
| 2003/0014162 A1 | 1/2003 | Sadano |
| 2003/0029648 A1 | 2/2003 | Trego et al. |
| 2003/0205433 A1 | 11/2003 | Hagman |
| 2004/0193363 A1 | 9/2004 | Schmidt et al. |
| 2004/0193374 A1 | 9/2004 | Hac et al. |
| 2005/0052412 A1 | 3/2005 | McRae |
| 2005/0073433 A1 | 4/2005 | Gunderson et al. |
| 2005/0216124 A1 | 9/2005 | Suzuki |
| 2005/0244259 A1 | 11/2005 | Chilson et al. |
| 2005/0247508 A1 | 11/2005 | Gilliland et al. |
| 2006/0125806 A1 | 6/2006 | Voyles et al. |
| 2006/0229744 A1 | 10/2006 | Patzwald et al. |
| 2006/0238156 A1 | 10/2006 | Kim |
| 2006/0250255 A1 | 11/2006 | Flanagan |
| 2007/0088477 A1 | 4/2007 | Brewer et al. |
| 2007/0109110 A1 * | 5/2007 | Ohmura ............... B60R 21/0134 340/435 |
| 2007/0112461 A1 | 5/2007 | Zini et al. |
| 2007/0129870 A1 * | 6/2007 | Lange et al. .................... 701/50 |
| 2007/0219720 A1 | 9/2007 | Trepagnier et al. |
| 2008/0071429 A1 | 3/2008 | Kraimer et al. |
| 2008/0129445 A1 | 6/2008 | Kraimer et al. |
| 2008/0189005 A1 | 8/2008 | Chilson et al. |
| 2008/0201044 A1 | 8/2008 | Yamada et al. |
| 2008/0202243 A1 | 8/2008 | Gross |
| 2008/0225271 A1 * | 9/2008 | Ohmura .......................... 356/51 |
| 2008/0253834 A1 * | 10/2008 | Colvard ............... E01C 19/006 404/84.05 |
| 2009/0076664 A1 | 3/2009 | McCabe et al. |
| 2009/0192710 A1 * | 7/2009 | Eidehall ............. B62D 15/0265 701/301 |
| 2009/0306835 A1 * | 12/2009 | Ellermann ........... A01B 69/008 701/2 |
| 2009/0326763 A1 * | 12/2009 | Rekow ................. A01B 69/006 701/42 |
| 2010/0063680 A1 * | 3/2010 | Tolstedt ................... G05D 1/12 701/41 |
| 2010/0114405 A1 | 5/2010 | Elston et al. |
| 2010/0145551 A1 | 6/2010 | Pulskamp et al. |
| 2010/0204866 A1 * | 8/2010 | Moshchuk et al. ............. 701/25 |

(56) References Cited

U.S. PATENT DOCUMENTS

| | | |
|---|---|---|
| 2011/0018699 A1 | 1/2011 | Chen et al. |
| 2011/0035086 A1 | 2/2011 | Kim et al. |
| 2011/0046813 A1 | 2/2011 | Castaneda et al. |

FOREIGN PATENT DOCUMENTS

| | | | |
|---|---|---|---|
| CN | 101267958 A | | 9/2008 |
| DE | 10033857 | | 1/2002 |
| DE | 102007027494 | A1 | 1/2009 |
| EP | 0406070 | A1 | 1/1991 |
| EP | 0243382 | B1 | 8/1992 |
| EP | 0556031 | A2 | 8/1993 |
| EP | 1462880 | A2 | 9/2004 |
| EP | 1813569 | A1 | 8/2007 |
| EP | 2036763 | A2 | 3/2009 |
| FR | 2764091 | A1 | 12/1998 |
| GB | 1002825 | | 9/1965 |
| GB | 2197799 A | | 6/1988 |
| GB | 2360500 | | 9/2001 |
| GB | 2398394 B | | 5/2006 |
| JP | 02152898 | | 6/1990 |
| JP | 07138000 A | | 5/1995 |
| JP | 2002104800 | | 4/2002 |
| JP | 2005094425 A | | 4/2005 |
| JP | 2006259877 A | | 9/2006 |
| JP | 2006293975 A | | 10/2006 |
| WO | 9215977 | | 9/1992 |
| WO | 9639679 | A1 | 12/1996 |
| WO | 2004057553 | | 7/2004 |
| WO | 2010065864 | A2 | 6/2010 |
| WO | 2011002478 | A2 | 1/2011 |

OTHER PUBLICATIONS

Patent Examination Report; Patent Application No. 2009351340; Feb. 12, 2015; IP Australia.

Masashi Honda; International Preliminary Report on Patentability and Written Opinion of the International Searching Authority; International Application No. PCT/US2007/078455; Mar. 17, 2009; International Bureau of WIPO; Geneva Switzerland.

Gregory Garcia; B.O.S.S. A Battery Operated Smart Servant; EEL 5666c; Intelligent Machines Design Lab; Sensor Presentation; Center for Intelligent Machines and Robotics; University of Florida; Aug. 17, 2006.

Weber et al.; "Ein tragbares Funk-Fernsteuergerat fur Gewinnungsmaschinen", Gluckauf, Minova Carbo Tech Gmbh; Jul. 13, 1967; pp. 375-378; XP002093388; ISSN; 0340-7896; Essen DE.

Emery, Carole; Invitation to Pay Additional Fees and Partial International Search; International Application No. PCT/US2007/078455; Sep. 3, 2008; European Patent Office.

Pham, Phong; International Search Report and Written Opinion of the International Searching Authority; International Application No. PCT/US2007/078455; Dec. 29, 2008; European Patent Office.

Application No. PCT/US2007/078455, filed Sep. 14, 2007, entitled "Systems and Methods of Remotely Controlling a Materials Handling Vehicle".

Application No. PCT/US2009/066789, filed Dec. 4, 2009, entitled "Multiple Zone Sensing for Materials Handling Vehicles".

Application No. PCT/US2009/069839, filed Dec. 30, 2009, entitled "Apparatus for Remotely Controlling a Materials Handling Vehicle".

Application No. PCT/US2009/069833, filed Dec. 30, 2009, entitled "Steer Correction for a Remotely Operated Materials Handling Vehicle".

Lalinde, Rafael; International Search Report and Written Opinion of the International Searching Authority; International Application No. PCT/US2009/066789; Dec. 16, 2010; European Patent Office.

Lalinde, Rafael; International Search Report and Written Opinion of the International Searching Authority; International Application No. PCT/US2009/069833; Dec. 2, 2010; European Patent Office.

Bourbon, G. et al.; Instantaneous Fuzzy Modelling for Obstacle Avoidance; Systems, Man and Cybernetics; Intelligent Systems for the 21st Century; IEEE International Conference; vol. 3; Oct. 22, 1995; pp. 2546-2551; New York, NY; USA.

Kovacs, S. et al.; Interpolation-based Fuzzy Logic Controller, as a Simplified Way for Constructing the Fuzzy Rulebase of the Path Tracking and Collision Avoidance Strategy of an AGV; Systems, Man and Cybernetics; IEEE International Conference; vol. 2; Oct. 11, 1998; pp. 1317-1322; New York, NY; USA.

Redhwan K. Mawari; Office Action-Final Rejection in U.S. Appl. No. 11/855,310; Sep. 1, 2010; U.S. Patent and Trademark Office; Alexandria, VA.

http://www.cajunbot.com/technology; 2011; CajunBot Labs.

http://www.cajunbot.com; 2011; CajunBot Labs.

Urban Challenge; http://www.darpa.mil/grandchallenge/index.asp; Nov. 3, 2007.

CajunBot Wiki; http:cajunbot.com/wiki/Main_Page; Apr. 18, 2010.

Urban Challenge; http://www.darpa.mil/grandchallenge/resources.asp; Nov. 2007.

U.S. Appl. No. 13/011,366, filed Jan. 21, 2011, entitled "Systems and Methods of Remotely Controlling a Materials Handling Vehicle".

Lalinde, Rafael; International Search Report and Written Opinion of the International Searching Authority; International Application No. PCT/US2009/069839; Mar. 16, 2011; European Patent Office.

Vano Gea, Joaquin; International Search Report and Written Opinion of the International Searching Authority; International Application No. PCT/US2012/022011; Jun. 20, 2012; European Patent Office.

Pitard, Jacqueline; Invitation to Pay Additional Fees and Communication Relating to the Results of the Partial International Search; International Application No. PCT/US2012/025849; Jul. 16, 2012; European Patent Office.

Desyllas, Dimitri; International Search Report and Written Opinion; International Application No. PCT/US2012/025849; Sep. 12, 2012; European Patent Office.

Khatib, Rami; Non-final Office Action in U.S. Appl. No. 12/631,007; Nov. 30, 2012; U.S. Patent and Trademark Office; Alexandria, VA.

To, Tuan; Non-final Office Action in U.S. Appl. No. 12/649,815; Aug. 29, 2012; U.S. Patent and Trademark Office; Alexandria, VA.

To, Tuan; Final Office Action in U.S. Appl. No. 12/649,815; Dec. 13, 2012; U.S. Patent and Trademark Office; Alexandria, VA.

Theunissen, Lars; International Search Report and Written Opinion; International Application No. PCT/US2012/058943; Jan. 22, 2013; European Patent Office.

To, Tuan; Final Office Action; U.S. Appl. No. 13/033,169; Oct. 4, 2013; United States Patent and Trademark Office; Alexandria, VA.

Athina Nickitas-Etienne; International Preliminary Report on Patentability and Written Opinion of the International Searching Authority for PCT/US2012/025849; Aug. 27, 2013; The International Bureau of WIPO.

Communication Pursuant to Rules 161(1) and 162 EPC; European Patent Application No. 12706413.7; Oct. 18, 2013; European Patent Office; Munich, Germany.

Gustafsson, Tomas (ZACCO for BT Products, Inc.); Notice of Opposition of European Patent No. 2,678,748; Dec. 29, 2015; Sweden; filed in the European Patent Office.

Schildberg, Dr. Peter (Hauck Patentanwaltspartnerschaft mbH for Jungheinrich); Notice of Opposition of European Patent No. 2,678,748; Dec. 22, 2015; Hamburg, Germany; filed in the European Patent Office.

Nayback Machine, "Getting Started: a Wall Following Robot"; Feb. 2, 2011; <www.mobotsoft.com>.

Durrant-Whyte, Hugh F., "An Autonomous Guided Vehicle for Cargo-Handling Applications;" The International Journal of Robotics Research, vol. 15, Oct. 1996, pp. 407-440.

\* cited by examiner

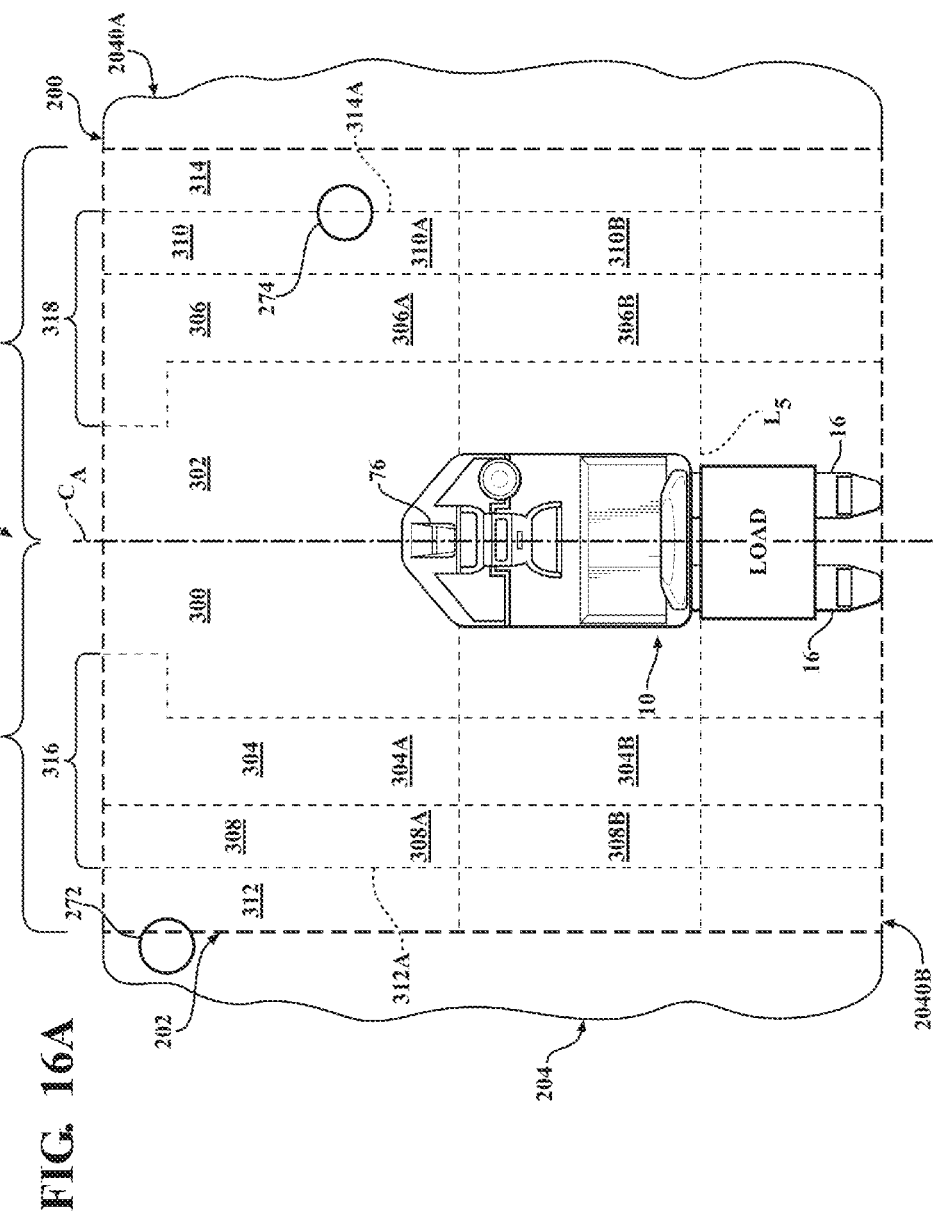

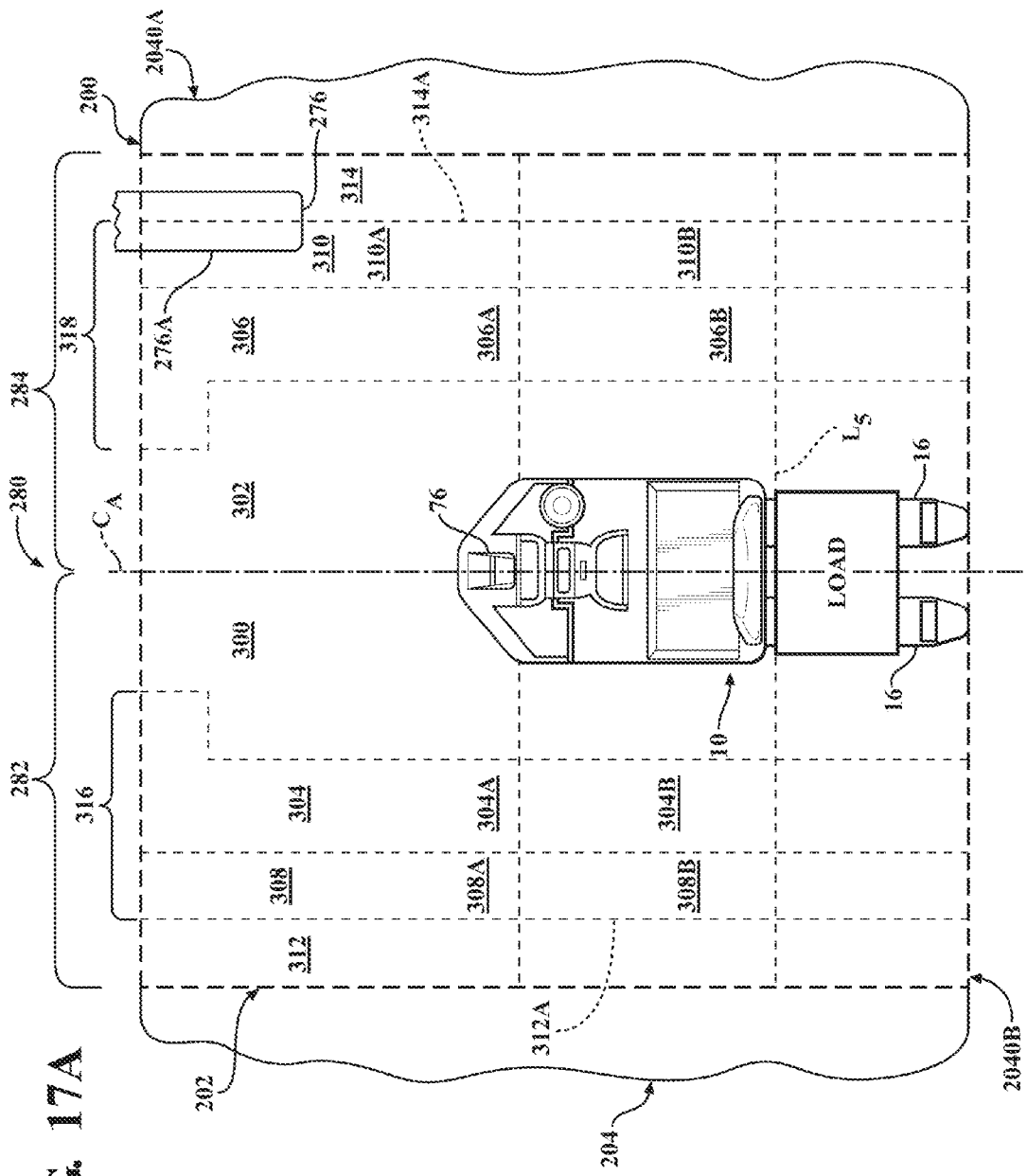

STEER MANEUVERS FOR MATERIALS HANDLING VEHICLES

CROSS REFERENCE TO RELATED APPLICATIONS

This application is a continuation of U.S. patent application Ser. No. 13/033,169, filed Feb. 23, 2011, the entire disclosure of which is hereby incorporated by reference herein. This application and U.S. patent application Ser. No. 13/033,169 are CIPs of U.S. patent application Ser. No. 12/649,815, filed Dec. 30, 2009, which claims the benefit of U.S. Provisional Patent Application Ser. No. 61/234,866, filed Aug. 18, 2009, the entire disclosures of each of which are hereby incorporated by reference herein. U.S. patent application Ser. No. 12/649,815 is a CIP of International Patent Application Serial No. PCT/US09/66789, filed Dec. 4, 2009, and is a CIP of U.S. patent application Ser. No. 12/631,007, filed Dec. 4, 2009, the entire disclosures of each of which are hereby incorporated by reference herein. This application and U.S. patent application Ser. No. 13/033,169 are CIPs of International Patent Application Serial No. PCT/US09/69833, filed Dec. 30, 2009, which claims the benefit of U.S. Provisional Patent Application Ser. No. 61/234,866, filed Aug. 18, 2009, the entire disclosures of each of which are hereby incorporated by reference herein. International Patent Application Serial No. PCT/US09/69833 is a CIP of International Patent Application Serial No. PCT/US09/66789, filed Dec. 4, 2009, and is a CIP of U.S. patent application Ser. No. 12/631,007, filed Dec. 4, 2009, the entire disclosures of each of which are already incorporated by reference herein.

BACKGROUND OF THE INVENTION

The present invention relates in general to materials handling vehicles, and more particularly, to object tracking and steer correction schemes for materials handling vehicles, such as remotely operated low level order picking truck.

Low level order picking trucks are commonly used for picking stock in warehouses and distribution centers. Such order picking trucks typically include load carrying forks and a power unit having a platform upon which an operator may step and ride while controlling the truck. The power unit also has a steerable wheel and corresponding traction and steering control mechanisms, e.g., a movable steering arm that is coupled to the steerable wheel. A control handle attached to the steering arm typically includes the operational controls necessary for driving the truck and operating its load handling features.

In a typical stock picking operation, an operator fills orders from available stock items that are located in storage areas provided along a plurality of aisles of a warehouse or distribution center. In this regard, the operator drives a low level order picking truck to a first location where item(s) are to be picked. In a pick process, the operator typically steps off the order picking truck, walks over to the appropriate location and retrieves the ordered stock item(s) from their associated storage area(s). The operator then returns to the order picking truck and places the picked stock on a pallet, collection cage or other support structure carried by the truck forks. Upon completing the pick process, the operator advances the order picking truck to the next location where item(s) are to be picked. The above process is repeated until all stock items on the order have been picked.

It is not uncommon for an operator to repeat the pick process several hundred times per order. Moreover, the operator may be required to pick numerous orders per shift. As such, the operator may be required to spend a considerable amount of time relocating and repositioning the order picking truck, which reduces the time available for the operator to spend picking stock.

BRIEF SUMMARY OF THE INVENTION

In accordance with various aspects of the present invention, methods and systems are provided for a materials handling vehicle to automatically perform a steer correction maneuver. Sensor data is received by a controller on a materials handling vehicle from at least one sensing device. Based on the received sensor data, a first object is detected that is located in a first zone defined at least partially on a first side of the vehicle, and a second object is detected that is located in a second zone defined at least partially on a second side of the vehicle, wherein the second object is closer to a central axis of the vehicle than the first object. A steer correction maneuver is automatically performed by steering the vehicle toward the first object so as to steer the vehicle away from the second object until at least one of: the first object enters a predefined portion of the first zone; and the second object exits a predefined portion of the second zone.

In accordance with other aspects of the present invention, methods and systems are provided for tracking objects detected by at least one sensing device on a materials handling vehicle. Sensor data is received by a controller on a materials handling vehicle from at least one sensing device. The sensor data includes: data representative of whether an object is detected in a scanned zone that is scanned by the at least one sensing device, the scanned zone being a part of an environment in which objects are tracked; and data representative of a lateral distance that any detected objects are from a reference coordinate associated with the vehicle. Each detected object is tracked until the object is no longer located in the environment by: assigning the object to at least one bucket defined within the scanned zone by the at least one sensing device; and using at least one of subsequent sensor data and dead reckoning to re-assign the object to adjacent buckets and to determine an updated lateral distance that the object is from the reference coordinate as the vehicle moves. The controller automatically implements a steer correction maneuver if a tracked object enters a steer away zone defined within the environment.

In accordance with other aspects of the present invention, methods and systems are provided for a materials handling vehicle to automatically implement a steer maneuver. Sensor data is received by a controller on a materials handling vehicle from at least one sensing device. A selected object is detected in an environment proximate the vehicle. A steer maneuver is performed by steering the vehicle such that the vehicle is substantially maintained at a desired distance from the selected object.

BRIEF DESCRIPTION OF THE SEVERAL VIEWS OF THE DRAWINGS

FIGS. 16A-16C are schematic illustrations of exemplary zones used for implementing steer maneuvers in a materials handling vehicle traveling under remote wireless operation according to various aspects of the present invention; and FIG. 17A-17C are schematic illustrations of a materials handling vehicle traveling down a warehouse aisle under remote wireless operation, which is automatically implementing steer maneuvers according to various aspects of the present invention.

DETAILED DESCRIPTION OF THE INVENTION

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Low Level Order Picking Truck

Figure 1:
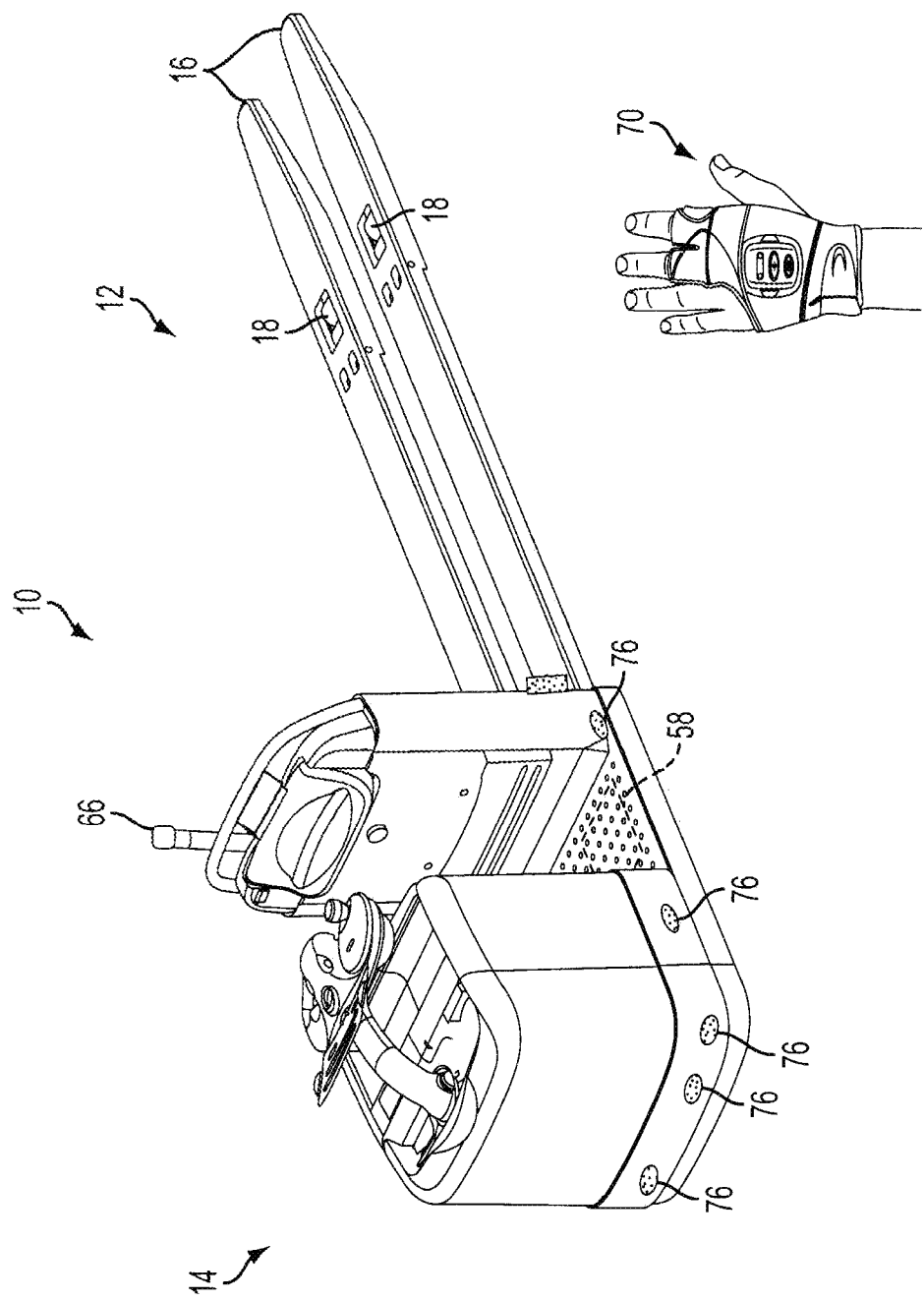
FIG. 1 is an illustration of a materials handling vehicle capable of remote wireless operation according to various aspects of the present invention.

Referring now to the drawings, and particularly to FIG. 1, a materials handling vehicle, which is illustrated as a low level order picking truck 10, includes in general a load handling assembly 12 that extends from a power unit 14. The load handling assembly 12 includes a pair of forks 16, each fork 16 having a load supporting wheel assembly 18. The load handling assembly 12 may include other load handling features in addition to, or in lieu of the illustrated arrangement of the forks 16, such as a load backrest, scissors-type elevating forks, outriggers or separate height adjustable forks. Still further, the load handling assembly 12 may include load handling features such as a mast, a load platform, collection cage or other support structure carried by the forks 16 or otherwise provided for handling a load supported and carried by the truck 10.

The illustrated power unit 14 comprises a step-through operator's station dividing a first end section of the power unit 14 (opposite the forks 16) from a second end section (proximate the forks 16). The step-through operator's station provides a platform upon which an operator may stand to drive the truck 10 and/or to provide a position from which the operator may operate the various included features of the truck 10.

Presence sensors 58 may be provided to detect the presence of an operator on the truck 10. For example, presence sensors 58 may be located on, above or under the platform floor, or otherwise provided about the operator's station. In the exemplary truck of FIG. 1, the presence sensors 58 are shown in dashed lines indicating that they are positioned under the platform floor. Under this arrangement, the presence sensors 58 may comprise load sensors, switches, etc. As an alternative, the presence sensors 58 may be implemented above the platform floor, such as by using ultrasonic, capacitive or other suitable sensing technology. The utilization of presence sensors 58 will be described in greater detail herein.

An antenna 66 extends vertically from the power unit 14 and is provided for receiving control signals from a corresponding wireless remote control device 70. The remote control device 70 may comprise a transmitter that is worn or otherwise maintained by the operator. The remote control device 70 is manually operable by an operator, e.g., by pressing a button or other control, to cause the remote control device 70 to wirelessly transmit at least a first type signal designating a travel request to the truck 10. The travel request is a command that requests the corresponding truck 10 to travel by a predetermined amount, as will be described in greater detail herein.

The truck 10 also comprises one or more obstacle sensors 76, which are provided about the truck 10, e.g., towards the first end section of the power unit 14 and/or to the sides of the power unit 14. The obstacle sensors 76 include at least one contactless obstacle sensor on the truck 10, and are operable to define at least one detection zone. For example, at least one detection zone may define an area at least partially in front of a forward traveling direction of the truck 10 when the truck 10 is traveling in response to a wirelessly received travel request from the remote control device 70, as will also be described in greater detail herein.

The obstacle sensors 76 may comprise any suitable proximity detection technology, such as an ultrasonic sensors, optical recognition devices, infrared sensors, laser scanner sensors, etc., which are capable of detecting the presence of objects/obstacles or are capable of generating signals that can be analyzed to detect the presence of objects/obstacles within the predefined detection zone(s) of the power unit 14.

In practice, the truck 10 may be implemented in other formats, styles and features, such as an end control pallet truck that includes a steering tiller arm that is coupled to a tiller handle for steering the truck. Similarly, although the remote control device 70 is illustrated as a glove-like structure 70, numerous implementations of the remote control device 70 may be implemented, including for example, finger worn, lanyard or sash mounted, etc. Still further, the truck, remote control system and/or components thereof, including the remote control device 70, may comprise any additional and/or alternative features or implementations, examples of which are disclosed in U.S. Provisional Patent Application Ser. No. 60/825,688, filed Sep. 14, 2006 entitled "SYSTEMS AND METHODS OF REMOTELY CONTROLLING A MATERIALS HANDLING VEHICLE;" U.S. patent application Ser. No. 11/855,310, filed Sep. 14, 2007 entitled "SYSTEMS AND METHODS OF REMOTELY CONTROLLING A MATERIALS HANDLING VEHICLE;" U.S. patent application Ser. No. 11/855,324, filed Sep. 14, 2007 entitled "SYSTEMS AND METHODS OF REMOTELY CONTROLLING A MATERIALS HANDLING VEHICLE;" U.S. Provisional Patent Application Ser. No. 61/222,632, filed Jul. 2, 2009, entitled "APPARATUS FOR REMOTELY CONTROLLING A MATERIALS HANDLING VEHICLE;" U.S. patent application Ser. No. 12/631,007, filed Dec. 4, 2009, entitled "MULTIPLE ZONE SENSING FOR MATERIALS HANDLING VEHICLES;" U.S. Provisional Patent Application Ser. No. 61/119,952, filed Dec. 4, 2008, entitled "MULTIPLE ZONE SENSING FOR REMOTELY CONTROLLED MATERIALS HANDLING VEHICLES;" and/or U.S. Pat. No. 7,017,689, issued Mar. 28, 2006, entitled "ELECTRICAL STEERING ASSIST FOR MATERIAL HANDLING VEHICLE;" the entire disclosures of which are each hereby incorporated by reference herein.

Control System for Remote Operation of a Low Level Order Picking Truck

Figure 2:
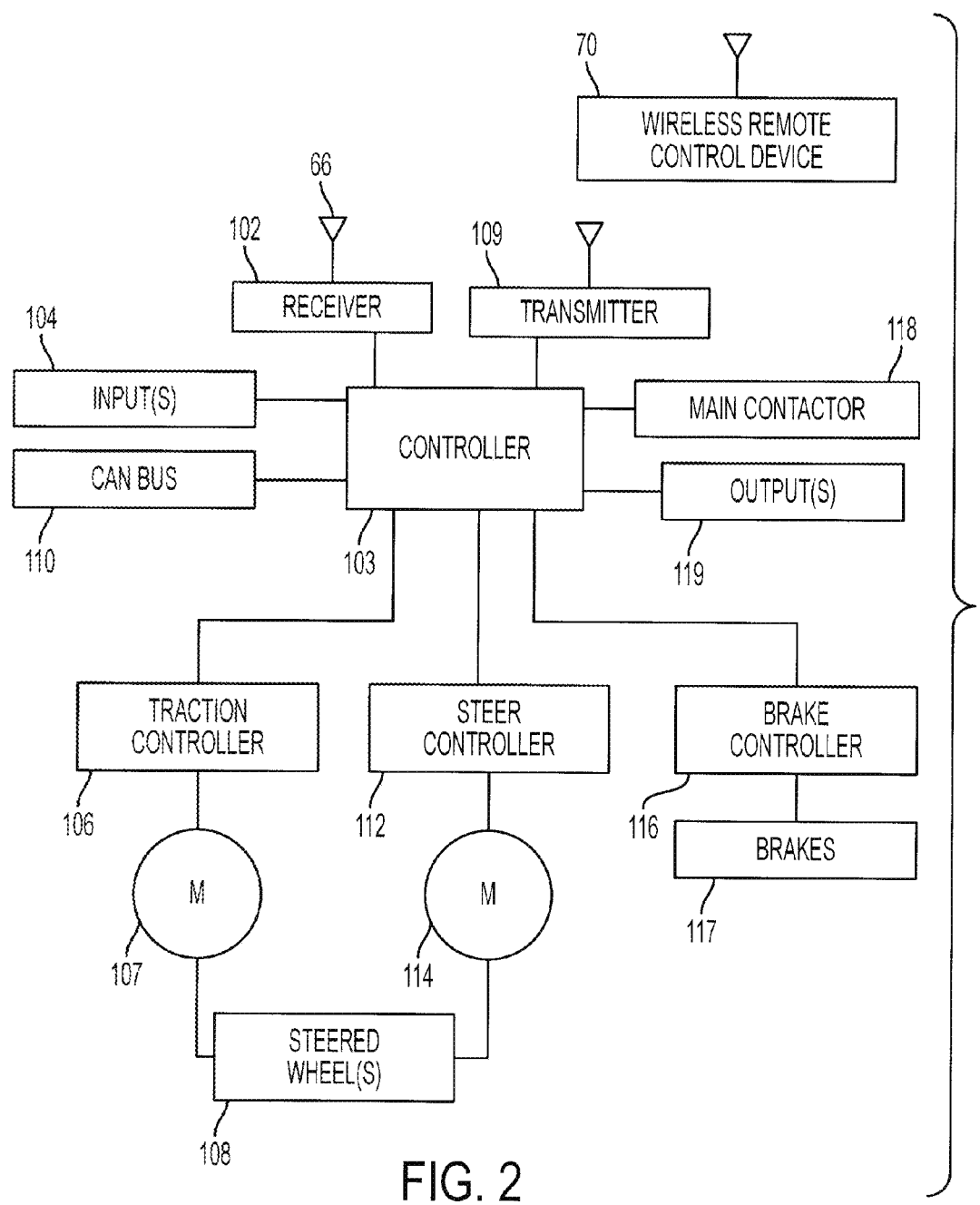
FIG. 2 is a schematic diagram of several components of a materials handling vehicle capable of remote wireless operation according to various aspects of the present invention.

Referring to FIG. 2, a block diagram illustrates a control arrangement for integrating remote control commands with the truck 10. The antenna 66 is coupled to a receiver 102 for receiving commands issued by the remote control device 70. The receiver 102 passes the received control signals to a controller 103, which implements the appropriate response to the received commands and may thus also be referred to herein as a master controller. In this regard, the controller 103 is implemented in hardware and may also execute software (including firmware, resident software, microcode, etc.) Furthermore, aspects of the present invention may take the form of a computer program product embodied in one or more computer readable medium(s) having computer readable program code embodied thereon. For example, the truck 10 may include memory that stores the computer program product, which, when implemented by a processor of the controller 103, implements steer correction as described more fully herein.

Thus, the controller 103 may define, at least in part, a data processing system suitable for storing and/or executing program code and may include at least one processor coupled directly or indirectly to memory elements, e.g., through a system bus or other suitable connection. The memory elements can include local memory employed during actual execution of the program code, memory that is integrated into a microcontroller or application specific integrated circuit (ASIC), a programmable gate array or other reconfigurable processing device, etc.

The response implemented by the controller 103 in response to wirelessly received commands, e.g., via the wireless transmitter 70 and corresponding antennae 66 and receiver 102, may comprise one or more actions, or inaction, depending upon the logic that is being implemented. Positive actions may comprise controlling, adjusting or otherwise affecting one or more components of the truck 10. The controller 103 may also receive information from other inputs 104, e.g., from sources such as the presence sensors 58, the obstacle sensors 76, switches, load sensors, encoders and other devices/features available to the truck 10 to determine appropriate action in response to the received commands from the remote control device 70. The sensors 58, 76, etc. may be coupled to the controller 103 via the inputs 104 or via a suitable truck network, such as a control area network (CAN) bus 110.

In an exemplary arrangement, the remote control device 70 is operative to wirelessly transmit a control signal that represents a first type signal such as a travel command to the receiver 102 on the truck 10. The travel command is also referred to herein as a "travel signal", "travel request" or "go signal". The travel request is used to initiate a request to the truck 10 to travel by a predetermined amount, e.g., to cause the truck 10 to advance or jog in a first direction by a limited travel distance. The first direction may be defined, for example, by movement of the truck 10 in a power unit 14 first, i.e., forks 16 to the back, direction. However, other directions of travel may alternatively be defined. Moreover, the truck 10 may be controlled to travel in a generally straight direction or along a previously determined heading. Correspondingly, the limited travel distance may be specified by an approximate travel distance, travel time or other measure.

Thus, a first type signal received by the receiver 102 is communicated to the controller 103. If the controller 103 determines that the travel signal is a valid travel signal and that the current vehicle conditions are appropriate (explained in greater detail below), the controller 103 sends a signal to the appropriate control configuration of the particular truck 10 to advance and then stop the truck 10. Stopping the truck 10 may be implemented, for example, by either allowing the truck 10 to coast to a stop or by initiating a brake operation to cause the truck 10 to brake to a stop.

As an example, the controller 103 may be communicably coupled to a traction control system, illustrated as a traction motor controller 106 of the truck 10. The traction motor controller 106 is coupled to a fraction motor 107 that drives at least one steered wheel 108 of the truck 10. The controller 103 may communicate with the traction motor controller 106 so as to accelerate, decelerate, adjust and/or otherwise limit the speed of the truck 10 in response to receiving a travel request from the remote control device 70. The controller 103 may also be communicably coupled to a steer controller 112, which is coupled to a steer motor 114 that steers at least one steered wheel 108 of the truck 10. In this regard, the truck 10 may be controlled by the controller 103 to travel an intended path or maintain an intended heading in response to receiving a travel request from the remote control device 70.

As yet another illustrative example, the controller 103 may be communicably coupled to a brake controller 116 that controls truck brakes 117 to decelerate, stop or otherwise control the speed of the truck 10 in response to receiving a travel request from the remote control device 70. Still further, the controller 103 may be communicably coupled to other vehicle features, such as main contactors 118, and/or other outputs 119 associated with the truck 10, where applicable, to implement desired actions in response to implementing remote travel functionality.

According to various aspects of the present invention, the controller 103 may communicate with the receiver 102 and with the traction controller 106 to operate the truck 10 under remote control in response to receiving travel commands from the associated remote control device 70. Moreover, the controller 103 may be configured to perform a first action if the truck 10 is traveling under remote control in response to a travel request and an obstacle is detected in a first one of previously detection zone(s). The controller 103 may be further configured to perform a second action different from the first action if the truck 10 is traveling under remote control in response to a travel request and an obstacle is detected in a second one of the detection zones. In this regard, when a travel signal is received by the controller 103 from the remote control device 70, any number of factors may be considered by the controller 103 to determine whether the received travel signal should be acted upon to initiate and/or sustain movement of the truck 10.

Correspondingly, if the truck 10 is moving in response to a command received by remote wireless control, the controller 103 may dynamically alter, control, adjust or otherwise affect the remote control operation, e.g., by stopping the truck 10, changing the steer angle of the truck 10, or taking other actions. Thus, the particular vehicle features, the state/condition of one or more vehicle features, vehicle environment, etc., may influence the manner in which controller 103 responds to travel requests from the remote control device 70.

The controller 103 may refuse to acknowledge a received travel request depending upon predetermined condition(s), e.g., that relate to environmental or/operational factor(s). For example, the controller 103 may disregard an otherwise valid travel request based upon information obtained from one or more of the sensors 58, 76. As an illustration, according to various aspects of the present invention, the controller 103 may optionally consider factors such as whether an operator is on the truck 10 when determining whether to respond to a travel command from the remote control device 70. As noted above, the truck 10 may comprise at least one presence sensor 58 for detecting whether an operator is positioned on the truck 10. In this regard, the controller 103 may be further configured to respond to a travel request to operate the truck 10 under remote control when the presence sensor(s) 58 designate that no operator is on the truck 10. Thus, in this implementation, the truck 10 cannot be operated in response to wireless commands from the transmitter unless the operator is physically off of the truck 10. Similarly, if the object sensors 76 detect that an object, including the operator, is adjacent and/or proximate to the truck 10, the controller 103 may refuse to acknowledge a travel request from the transmitter 70. Thus, in an exemplary implementation, an operator must be located within a limited range of the truck 10, e.g., close enough to the truck 10 to be in wireless communication range (which may be limited to set a maximum distance of the operator from the truck 10). Other arrangements may alternatively be implemented.

Any other number of reasonable conditions, factors, parameters or other considerations may also/alternatively be implemented by the controller 103 to interpret and take action in response to received signals from the transmitter. Other exemplary factors are set out in greater detail in U.S. Provisional Patent Application Ser. No. 60/825,688, entitled "SYSTEMS AND METHODS OF REMOTELY CONTROLLING A MATERIALS HANDLING VEHICLE;" U.S. patent application Ser. No. 11/855,310, entitled "SYSTEMS AND METHODS OF REMOTELY CONTROLLING A MATERIALS HANDLING VEHICLE;" U.S. patent application Ser. No. 11/855,324, entitled "SYSTEMS AND METHODS OF REMOTELY CONTROLLING A MATERIALS HANDLING VEHICLE;" U.S. Provisional Patent Application Ser. No. 61/222,632, entitled "APPARATUS FOR REMOTELY CONTROLLING A MATERIALS HANDLING VEHICLE;" U.S. patent application Ser. No. 12/631,007, entitled "MULTIPLE ZONE SENSING FOR MATERIALS HANDLING VEHICLES;" and U.S. Provisional Patent Application Ser. No. 61/119,952, entitled "MULTIPLE ZONE SENSING FOR REMOTELY CONTROLLED MATERIALS HANDLING VEHICLES;" the disclosures of which are each already incorporated by reference herein.

Upon acknowledgement of a travel request, the controller 103 interacts with the traction motor controller 106, e.g., directly or indirectly, e.g., via a bus such as the CAN bus 110 if utilized, to advance the truck 10 by a limited amount. Depending upon the particular implementation, the controller 103 may interact with the traction motor controller 106 and optionally, the steer controller 112, to advance the truck 10 by a predetermined distance. Alternatively, the controller 103 may interact with the traction motor controller 106 and optionally, the steer controller 112, to advance the truck 10 for a period of time in response to the detection and maintained actuation of a travel control on the remote 70. As yet another illustrative example, the truck 10 may be configured to jog for as long as a travel control signal is received. Still further, the controller 103 may be configured to "time out" and stop the travel of the truck 10 based upon a predetermined event, such as exceeding a predetermined time period or travel distance regardless of the detection of maintained actuation of a corresponding control on the remote control device 70.

The remote control device 70 may also be operative to transmit a second type signal, such as a "stop signal", designating that the truck 10 should brake and/or otherwise come to rest. The second type signal may also be implied, e.g., after implementing a "travel" command, e.g., after the truck 10 has traveled a predetermined distance, traveled for a predetermined time, etc., under remote control in response to the travel command. If the controller 103 determines that a wirelessly received signal is a stop signal, the controller 103 sends a signal to the traction controller 106, the brake controller 116 and/or other truck component to bring the truck 10 to a rest. As an alternative to a stop signal, the second type signal may comprise a "coast signal" or a "controlled deceleration signal" designating that the truck 10 should coast, eventually slowing to rest.

The time that it takes to bring the truck 10 to a complete rest may vary, depending for example, upon the intended application, the environmental conditions, the capabilities of the particular truck 10, the load on the truck 10 and other similar factors. For example, after completing an appropriate jog movement, it may be desirable to allow the truck 10 to "coast" some distance before coming to rest so that the truck 10 stops slowly. This may be achieved by utilizing regenerative braking to slow the truck 10 to a stop. Alternatively, a braking operation may be applied after a predetermined delay time to allow a predetermined range of additional travel to the truck 10 after the initiation of the stop operation.

It may also be desirable to bring the truck 10 to a relatively quicker stop, e.g., if an object is detected in the travel path of the truck 10 or if an immediate stop is desired after a successful jog operation. For example, the controller may apply predetermined torque to the braking operation. Under such conditions, the controller 103 may instruct the brake controller 116 to apply the brakes 117 to stop the truck 10.

Detection Zones of a Materials Handling Vehicle

Figure 3:
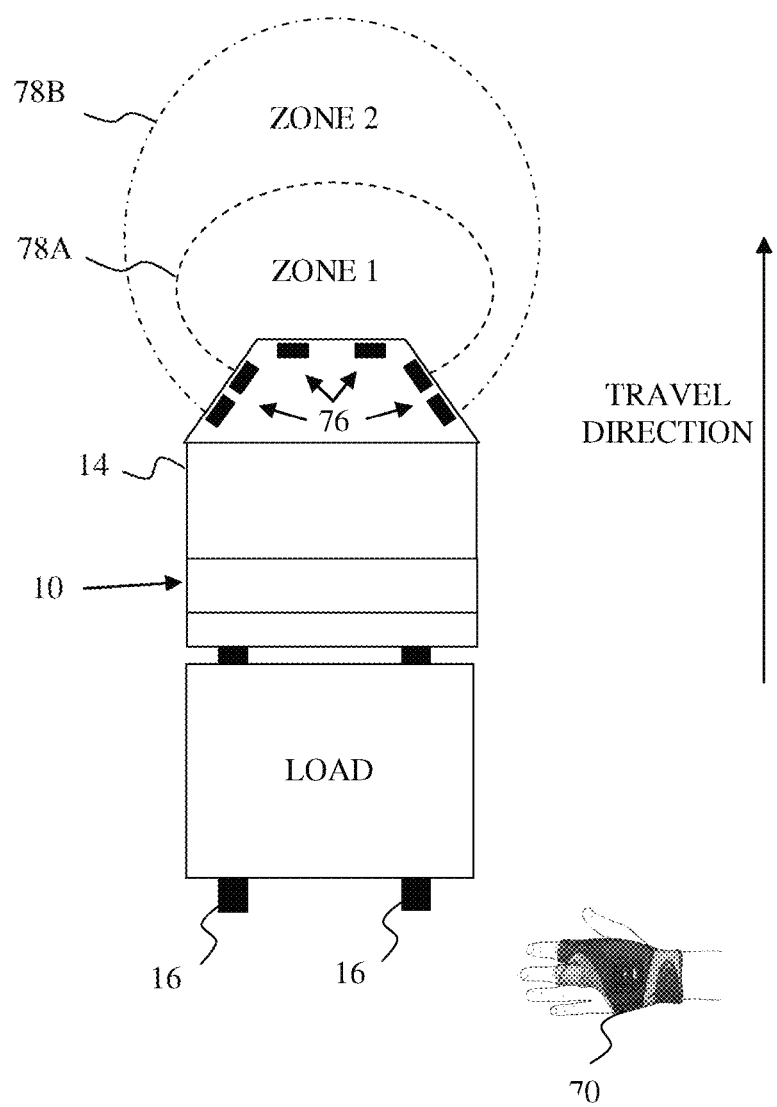
FIG. 3 is a schematic diagram illustrating detection zones of a materials handling vehicle according to various aspects of the present invention.

Referring to FIG. 3, according to various aspects of the present invention, one or more obstacle sensors 76 are configured so as to collectively enable detection of objects/obstacles within multiple "detection zones". In this regard, the controller 103 may be configured to alter one or more operational parameters of the truck 10 in response to detection of an obstacle in one or more of the detection zones as set out in greater detail herein. The control of the truck 10 utilizing detection zones may be implemented when an operator is riding/driving the truck 10. One or more detection zones may also be disabled or otherwise ignored by the controller 103 when an operator is riding on/driving the truck 10, e.g., to allow the operator to navigate the truck 10 in tight spaces. The control of the truck 10 utilizing detection zones may also be integrated with supplemental remote control as set out and described more fully herein.

Although six obstacle sensors 76 are shown for purposes of clarity of discussion herein, any number of obstacle sensors 76 may be utilized. The number of obstacle sensors 76 will likely vary, depending upon the technology utilized to implement the sensor, the size and/or range of the detection zones, the number of detection zones, and/or other factors.

In the illustrative example, a first detection zone 78A is located proximate to the power unit 14 of the truck 10. A second detection zone 78B is defined adjacent to the first detection zone 78A and appears to generally circumscribe the first detection zone 78A. A third area is also conceptually defined as all area outside the first and second detection zones 78A, 78B. Although the second detection zone 78B is illustrated as substantially circumscribing the first detection zone 78A, any other practical arrangement that defines the first and second detection zones 78A, 78B may be realized. For example, all or certain portions of the detection zones 78A, 78B may intersect, overlap or be mutually exclusive. Moreover, the particular shape of the detection zones 78A, 78B can vary. Still further, any number of detection zones may be defined, further examples of which are described in greater detail herein.

Still further, the detection zones need not surround the entire truck 10. Rather, the shape of the detection zones may be dependent upon the particular implementation as set out in greater detail herein. For example, if the detection zones 78A, 78B are to be used for speed control while the truck 10 is moving without an operator riding thereon, under remote travel control in a power unit first (forks to the rear) orientation, then the detection zones 78A, 78B may be oriented at least forward of the direction of travel of the truck 10. However, the detection zones can also cover other areas, e.g., adjacent to the sides of the truck 10.

According to various aspects of the present invention, the first detection zone 78A may further designate a "stop zone". Correspondingly, the second detection zone 78B may further designate a "first speed zone". Under this arrangement, if an object, e.g., some form of obstacle is detected within the first detection zone 78A, and the materials handling vehicle, e.g., truck 10, is traveling under remote control in response to a travel request, then the controller 103 may be configured to implement an action such as a "stop action" to bring the truck 10 to a stop. In this regard, travel of the truck 10 may continue once the obstacle is clear, or a second, subsequent travel request from the remote control device 70 may be required to restart travel of the truck 10 once the obstacle is cleared.

If a travel request is received from the remote control device 70 while the truck is at rest and an object is detected within the first detection zone 78A, then the controller 103 may refuse the travel request and keep the truck at rest until the obstacle is cleared out of the stop zone.

If an object/obstacle is detected within the second detection zone 78B, and the materials handling truck 10 is traveling under remote control in response to a travel request, then the controller 103 may be configured to implement a different action. For example, the controller 103 may implement a first speed reduction action to reduce the speed of the truck 10 to a first predetermined speed, such as where the truck 10 is traveling at a speed greater than the first predetermined speed.

Thus, assume the truck 10 is traveling in response to implementing a travel request from the remote control device at a speed V2 as established by a set of operating conditions where the obstacle sensors 76 do not detect an obstacle in any detection zone. If the truck is initially at rest, the truck may be accelerated up to speed V2. The detection of an obstacle within the second detection zone 78B (but not the first detection zone 78A) may cause the truck 10, e.g., via the controller 103 to alter at least one operational parameter, e.g., to slow down the truck 10 to a first predetermined speed V1, which is slower than the speed V2. That is, V1<V2. Once the obstacle is cleared from the second detection zone 78B, the truck 10 may resume its speed V2, or the truck 10 may maintain its speed V1 until the truck stops and the remote control device 70 initiates another travel request. Still further, if the detected object is subsequently detected within the first detection zone 78A, the truck 10 will be stopped as described more fully herein.

Assume as an illustrative example, that the truck 10 is configured to travel at a speed of approximately 2.5 miles per hour (mph) (4 Kilometers per hour (Km/h)) for a limited, predetermined amount, if the truck 10 is traveling without an operator onboard and is under remote wireless control in response to a travel request from a corresponding remote control 70, so long as no object is detected in a defined detection zone. If an obstacle is detected in the second detection zone 78B, then the controller 103 may adjust the speed of the truck 10 to a speed of approximately 1.5 mph (2.4 Km/h) or some other speed less than 2.5 miles per hour (mph) (4 Kilometers per hour (Km/h)). If an obstacle is detected in the first detection zone 78A, then the controller 103 stops the truck 10.

The above example assumes that the truck 10 is traveling under remote wireless control in response to a valid signal received from the transmitter 70. In this regard, the obstacle sensors 76 can be used to adjust the operating conditions of the unoccupied truck 10. However, the obstacle sensors 76 and corresponding controller logic may also be operative when the truck 10 is being driven by an operator, e.g., riding on the platform or other suitable location of the truck 10. Thus, according to various aspects of the present invention, the controller 103 may stop the truck 10 or refuse to allow the truck 10 to move if an object is detected within the stop zone 78A regardless of whether the truck is being driven by an operator or operating automatically in response to receiving a corresponding wirelessly transmitted travel request.

Correspondingly, depending upon the specific implementation, speed control/limiting capability of the controller 103, e.g., in response to detecting an object in the second detection zone 78B but not the first detection zone 78A, may be implemented regardless of whether the truck 10 is traveling in response to receiving a corresponding wirelessly transmitted travel request, or whether an operator is riding on the truck 10 while driving it.

However, according to various aspects of the present invention and as noted briefly above, there may be situations where it is desirable to disable one or more of the detection zones when the truck 10 is being driven by an operator. For example, it may be desirable to override/disable the obstacle sensors 76/controller logic while the operator is driving the truck 10 regardless of external conditions. As a further example, it may be desirable to override/disable the obstacle sensors 76/controller logic while the operator is driving the truck 10 to allow the operator to navigate the truck 10 in tight quarters, e.g., to navigate tight spaces, travel around corners, etc., that might otherwise activate one or more of the detection zones. As such, the activation of the controller logic, e.g., within the controller 103 to utilize the detection of objects in the detection zones to help control the truck 10 while the truck 10 is occupied by an operator, according to various aspects of the present invention, may be manually controlled, programmably controlled or otherwise selectively controlled.

Figure 4:
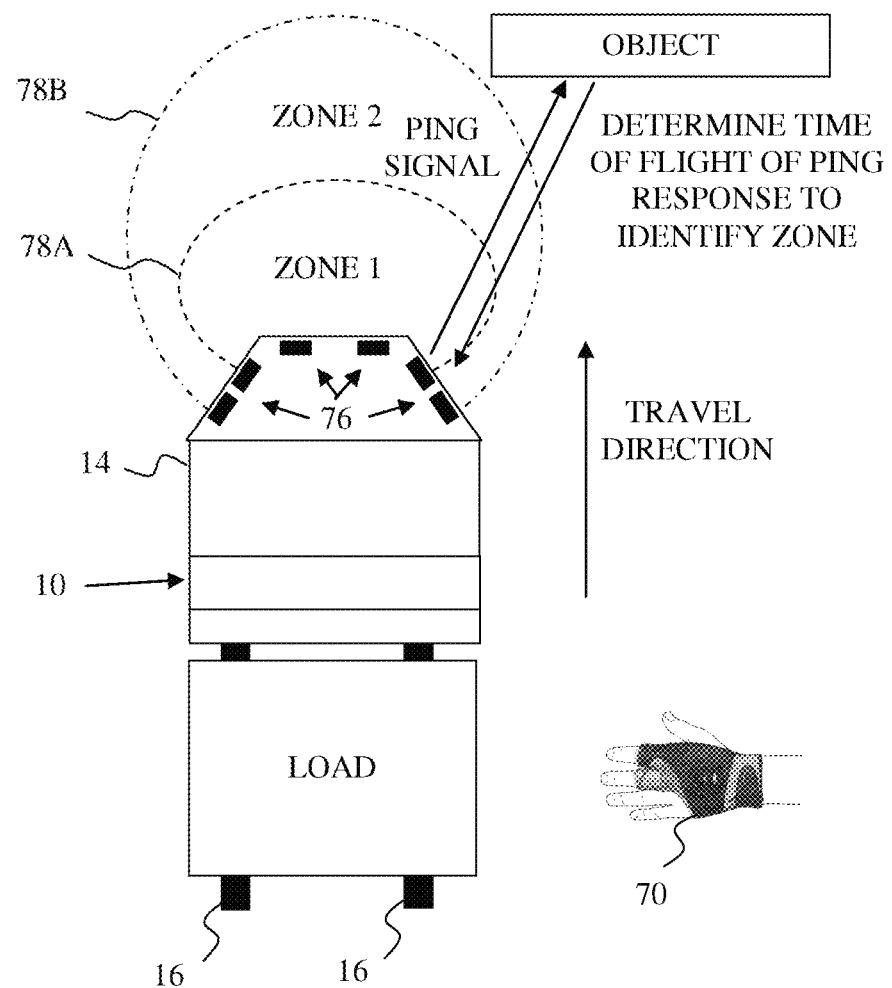
FIG. 4 is a schematic diagram illustrating an exemplary approach for detecting an object according to various aspects of the present invention.

Referring to FIG. 4, according to further aspects of the present invention, one or more of the obstacle sensors 76 may be implemented by ultrasonic technology or other suitable contactless technology capable of a distance measurement and/or position determination. Thus, the distance to an object can be measured, and/or a determination may be made so as to ascertain whether the detected object is within a detection zone 78A, 78B, e.g., by virtue of the distance of the object from the truck 10. As an example, an obstacle sensor 76 may be implemented by an ultrasonic sensor or transducer that provides a "ping" signal, such as a high frequency signal generated by a piezo element. The ultrasonic sensor 76 then rests and listens for a response. In this regard, time of flight information may be determined and utilized to define each zone. Thus, a controller, e.g., the controller 103 or a controller specifically associated with the obstacle sensors 76 may utilize software that looks at time of flight information to determine whether an object is within a detection zone.

According to further aspects of the present invention, multiple obstacle sensors 76 can work together to obtain object sensing. For example, a first ultrasonic sensor may send out a ping signal. The first ultrasonic sensor and one or more additional ultrasonic sensors may then listen for a response. In this way, the controller 103 may use diversity in identifying the existence of an object within one or more of the detection zones.

Figure 5:
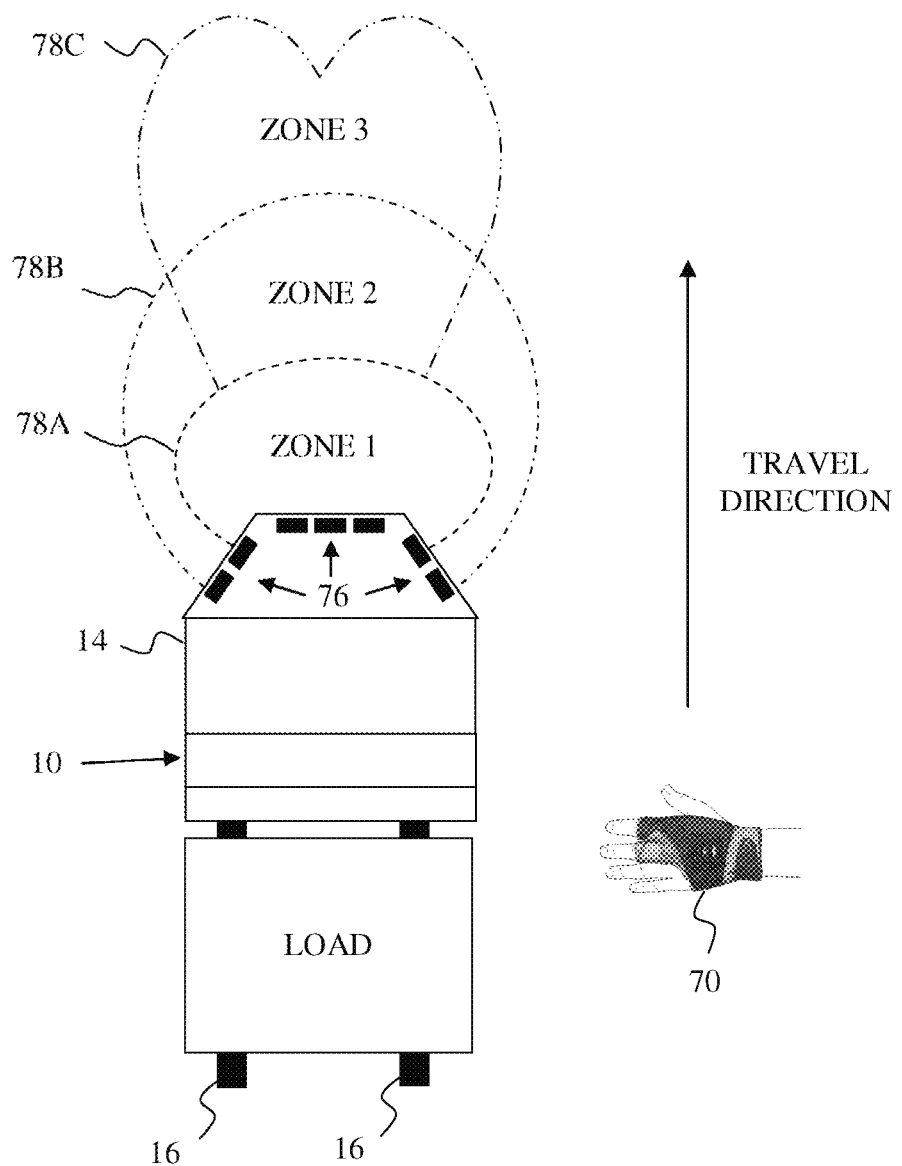
FIG. 5 is a schematic diagram illustrating a plurality of detection zones of a materials handling vehicle according to further aspects of the present invention.

With reference to FIG. 5, an implementation of multiple speed zone control is illustrated according to yet further aspects of the present invention. As illustrated, three detection zones are provided. If an object such as an obstacle is detected in the first detection zone 78A and the truck 10 is traveling in response to receiving a corresponding wirelessly transmitted travel request by the transmitter 70, then a first action may be performed, e.g., the truck 10 may be brought to a stop as described more fully herein. If an object such as an obstacle is detected in the second detection zone 78B and the truck 10 is traveling in response to receiving a corresponding wirelessly transmitted travel request by the transmitter 70, then a second action may be performed, e.g., the vehicle speed may be limited, reduced, etc. Thus, the second detection zone 78B may further designate a first speed zone. For example, the speed of the truck 10 may be reduced and/or limited to a first relatively slow speed, e.g., approximately 1.5 mph (2.4 Km/h).

If an object such as an obstacle is detected in the third detection zone 78C and the truck 10 is traveling in response to receiving a corresponding wirelessly transmitted travel request by the transmitter 70, then a third action may be performed, e.g., the truck 10 may be reduced in speed or otherwise limited to a second speed, e.g., approximately 2.5 mph (4 Km/h). Thus, the third detection zone may further designate a second speed zone. If no obstacles are detected in the first, second and third detection zones 78A, 78B, 78C, then the truck 10 may be remotely commanded to travel a limited amount, e.g., at a rate that is greater than the rate of speed when an obstacle is in the third detection zone, e.g., a speed of approximately 4 mph (6.2 Km/h).

As FIG. 5 further illustrates, the detection zones may be defined by different patterns relative to the truck 10. Also, in FIG. 5, a seventh obstacle sensor 76 is utilized, however any number of sensors may be provided, depending upon the technology utilized and/or the features to be implemented. By way of illustration and not by way of limitation, the seventh obstacle sensor 76 may be approximately centered, such as on the bumper or other suitable location on the truck 10. On an exemplary truck 10, the third zone 78C may extend approximately 6.5 feet (2 meters) forward of the power unit 14 of the truck 10.

According to various aspects of the present invention, any number of detection zones of any shape may be implemented. For example, depending upon desired truck performance, many small zones may be defined at various coordinates relative to the truck 10. Similarly, a few large detection zones may be defined based upon desired truck performance. As an illustrative example, a table may be set up in the memory of the controller. If travel speed while operating under remote travel control is an operational parameter of interest, then the table may associate travel speed with the detection zones defined by distance, range, position coordinates or some other measure. If the truck 10 is traveling in response to receiving a corresponding wirelessly transmitted travel request by the transmitter 70 and an obstacle sensor detects an object, then the distance to that detected object may be used as a "key" to look up a corresponding travel speed in the table. The travel speed retrieved from the table can be utilized by the controller 103 to adjust the truck 10, e.g., to slow it down, etc.

The areas of each detection zone may be chosen, for example, based upon factors such as the desired speed of the truck when the truck 10 is traveling in response to a valid, received travel request from the remote control device 70, the required stopping distance, the anticipated load to be transported by the truck 10, whether a certain amount of coast is required for load stability, vehicle reaction time, etc. Moreover, factors such as the range of each desired detection zone etc. may be considered to determine the number of obstacle sensors 76 required. In this regard, such information may be static, or dynamic, e.g., based upon operator experience, vehicle load, nature of the load, environmental conditions, etc. It is also contemplated that the controller 103 may generate a warning signal or alarm if an object or a person is detected in a detection zone.

As an illustrative example, in a configuration with multiple detection zones, e.g., three detection zones, as many as seven or more object detectors, e.g., ultrasonic sensors or laser sensors, may be used to provide a range of coverage desired by a corresponding application. In this regard, the detector(s) may be able to look ahead of the direction of travel of the truck 10 by a sufficient distance to allow the appropriate response, e.g., to slow down. In this regard, at least one sensor may be capable of looking several meters forward in the direction of travel of the truck 10.

According to various aspects of the present invention, the multiple detection speed zones allows a relatively greater maximum forward travel speed while operating in response to wirelessly received travel commands. Such an arrangement may prevent unnecessarily early vehicle stops by providing one or more intermediate zones where the truck 10 slows down before deciding to come to a complete stop.

According to further aspects of the present invention, the utilization of multiple detection zones allows a system that rewards the corresponding operator for better alignment of the truck 10 during pick operations. For example, an operator may position the truck 10 so as to not be aligned with a warehouse aisle. In this example, as the truck 10 is jogged forward, the second detection zone 78B may initially detect an obstacle such as a pick bin or warehouse rack. In response to detecting the rack, the truck 10 will slow down. If the rack is sensed in the first detection zone 78A, then the truck 10 will come to rest, even if the truck 10 has not jogged its entire programmed jog distance. Similar un-necessary slow downs or stops may also occur in congested and/or messy aisles.

According to various aspects of the present invention, the truck 10 may shape speed and braking operation parameters based upon the information obtained from the obstacle sensors 76. Moreover, the logic implemented by the truck 10 in response to the detection zones may be changed or varied depending upon a desired application. As a few illustrative examples, the boundaries of each zone in a multiple zone configuration may be programmably (and/or reprogrammably) entered in the controller, e.g., flash programmed. In view of the defined zones, one or more operational parameters may be associated with each zone. The established operational parameters may define a condition, e.g., maximum allowable travel speed, an action, e.g., brake, coast or otherwise come to a controlled stop, etc. The action may also be an avoidance action. For example, an action may comprise adjusting a steer angle or heading of the truck 10 as will be described in greater detail herein.

Figure 6:
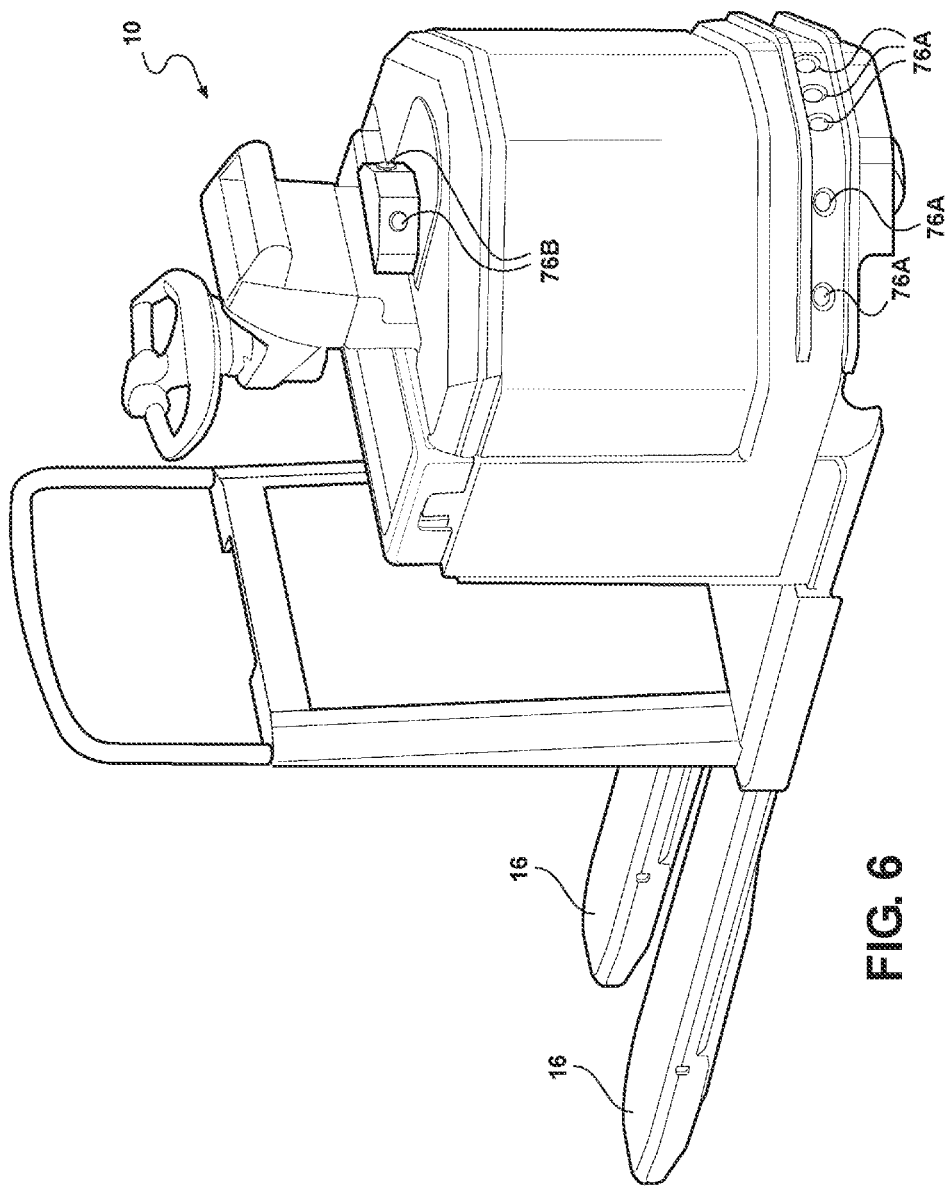
FIG. 6 is an illustration of a materials handling vehicle having spaced-apart obstacle detectors according to various aspects of the present invention.
Figure 7:
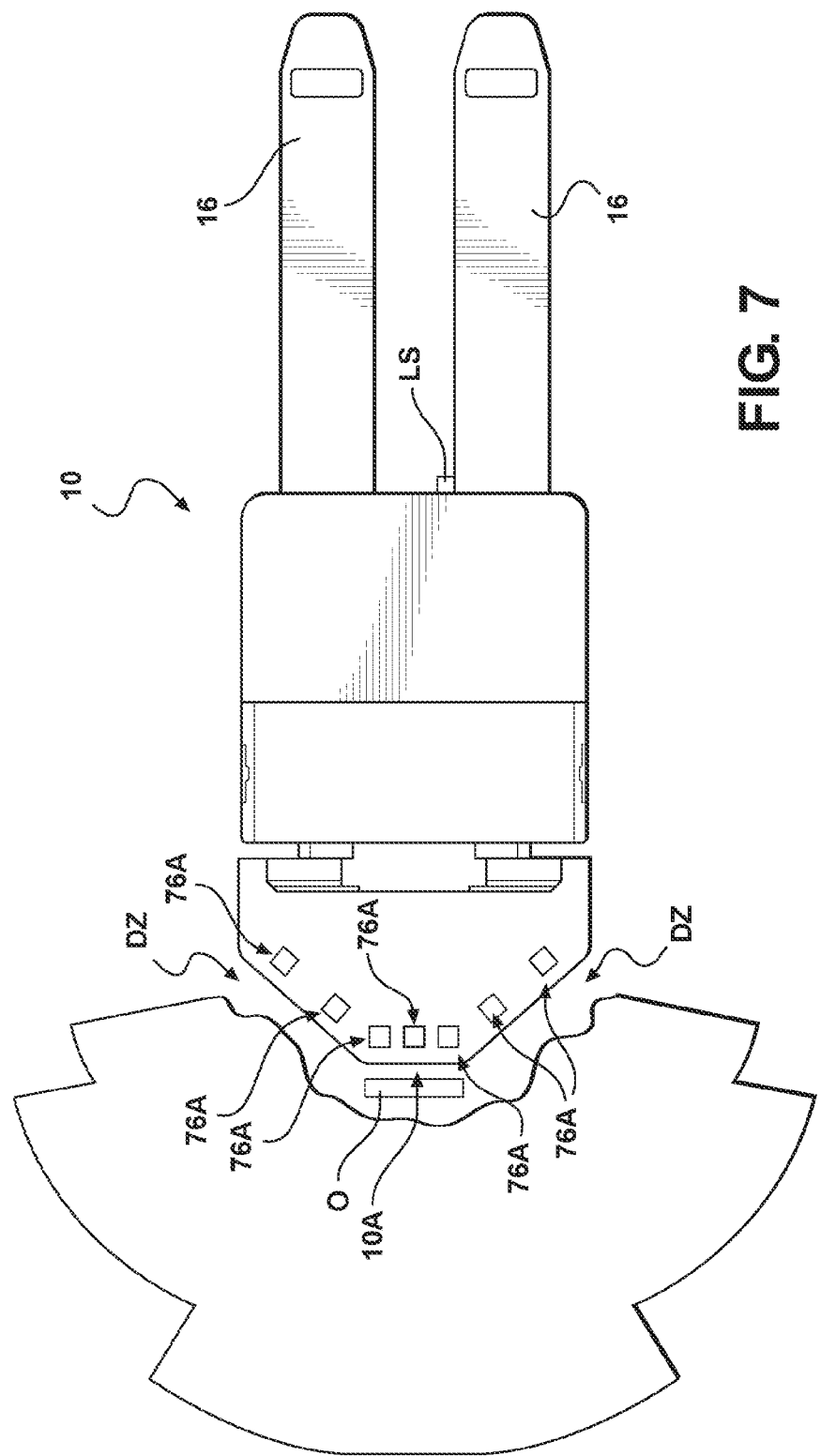
FIG. 7 is an illustration of a materials handling vehicle having obstacle detectors according to further aspects of the present invention.
Figure 8:
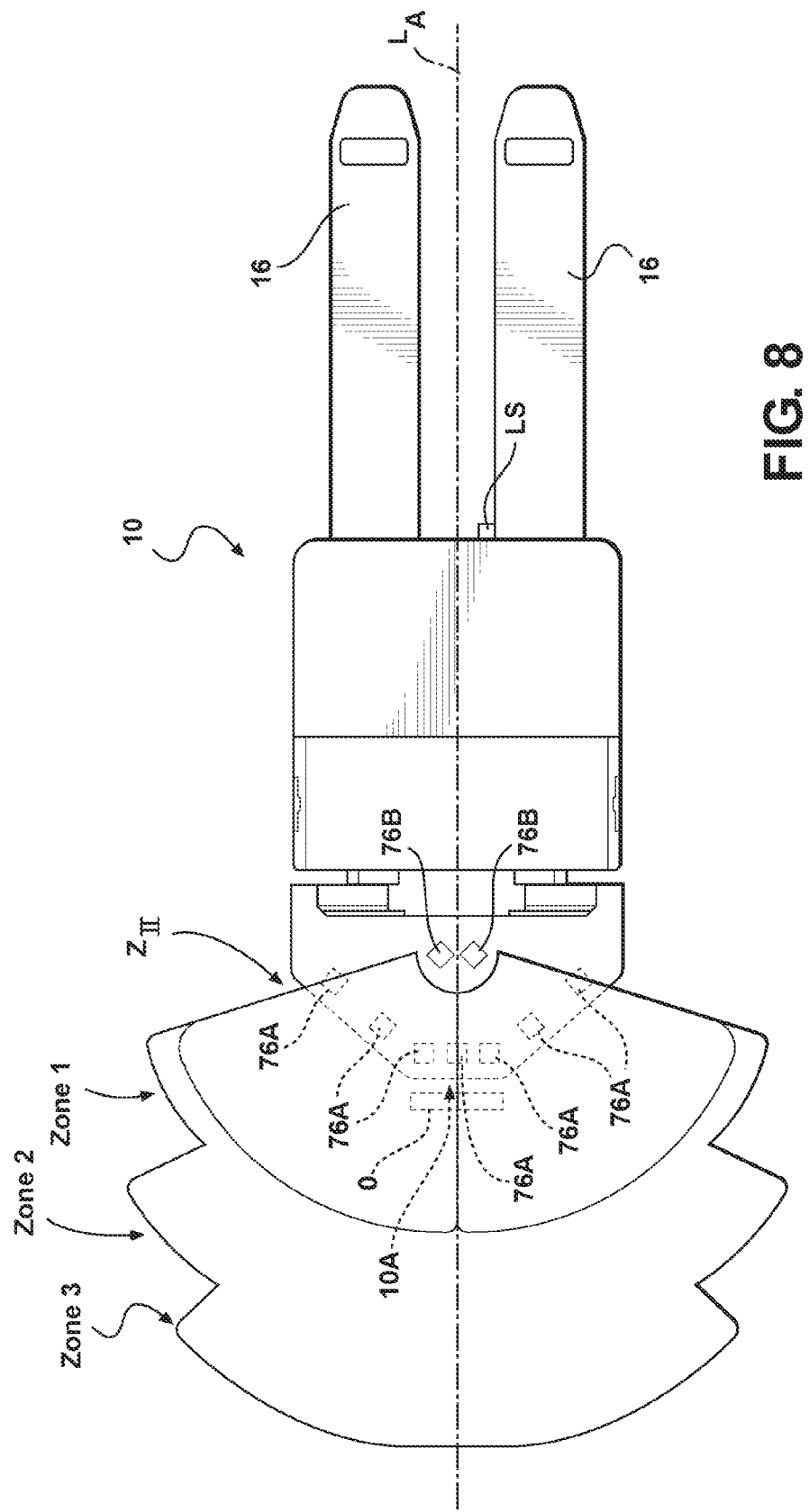
FIG. 8 is an illustration of a materials handling vehicle having obstacle detectors according to still further aspects of the present invention.

In accordance with a further embodiment of the present invention, one or more obstacle sensors, such as the obstacle sensors 76A, 76B shown in FIGS. 6 and 8, may be employed to sense or detect objects within first, second and third detection zones in front of the truck 10 when the truck 10 is traveling in response to a travel request wirelessly received from the transmitter 70. The controller 103 or other sensor processing device may also generate an object-detected signal and optionally, a distance signal in response to sensing/detecting an object in front of the truck 10. As an illustrative example, a further input 104 into the controller 103 may be a weight signal generated by a load sensor LS, as illustrated in FIGS. 7 and 8, which senses the combined weight of the forks 16 and any load on the forks 16. The load sensor LS is shown schematically in FIGS. 7 and 8 near the forks 16, but may be incorporated into a hydraulic system for effecting lift of the forks 16. By subtracting the weight of the forks 16 (a known constant value) from the combined weight defined by the weight signal, the controller 103 determines the weight of the load on the forks. Using sensed load weight and whether an object has been detected in one of the first, second and third detection zones as inputs into a lookup table or appropriate equations, the controller 103 generates an appropriate vehicle stop or maximum allowable speed signal.

Values defining the vehicle stop and maximum allowable speed signals may be experimentally determined and stored in a look-up table, computed in real time based upon a predetermined formula, etc. In the illustrated embodiment, the controller 103 determines the weight of a load on the forks 16 and whether an obstacle has been detected in one of the first, second and third detection zones and, using a lookup table it effects a stop command or defines a maximum allowable speed for the truck 10 and generates a corresponding maximum allowable speed signal for the truck 10.

As an example, if no load is on the forks 16 and no object is being detected by the obstacle sensors 76A, 76B in any one of the first, second and third detection zones, the controller 103 allows the truck 10 to be operated at any speed up to and including a maximum speed of 4.5 MPH. If no object is being detected in any one of the first, second and third detection zones, the maximum permitted speed of the truck 10 may be configured for example, to decrease as the load on the truck 10 increases. As an illustration, for a load weight of 8000 pounds, the maximum allowable speed of the truck 10 may be 2.5 MPH. It is noted that, in some locations the maximum allowable speed of the truck 10, if unoccupied by a rider, may be set at a predetermined upper limit, e.g., 3.5 MPH. Hence, the maximum speed of the vehicle, if unoccupied by a rider, may be set, e.g., by the controller 103, at this maximum allowable speed.

For any load weight on the forks 16, if an object is detected in the first detection zone, the controller 103 generates a "stop signal," designating that the truck 10 come to a substantially immediate stop. For any given load weight, the maximum allowable speed of the truck 10 is progressively greater the further the object is from the truck 10. Also for any given load weight, the maximum allowable speed of the truck 10 is less if an object is detected in the second detection zone as compared to when an object is detected in the third detection zone. The maximum allowable vehicle speeds for the second and third detection zones are defined for each load weight so that the speed of the truck 10 can be reduced in a controlled manner as the truck 10 continues to move towards the object so that the truck 10 can eventually be safely brought to a stop prior to the truck reaching the point where the object is located. These speeds may be determined experimentally, based upon formulas or a combination thereof, and can vary based on vehicle type, size and truck braking capabilities.

As an illustrative example, assume that the load weight on the forks 16 is 1500 pounds and three detection zones are provided, including a first detection zone nearest the truck, followed by a second detection zone and a third detection zone furthest from the truck. If a sensed object is located at a distance within the third detection zone, then the maximum allowable vehicle speed may be set to a speed such as 3 MPH. Hence, if the truck 10 is traveling at a speed greater than 3 MPH when the object is detected, the controller 103 effects a speed reduction so that the vehicle speed is reduced to 3.0 MPH.

If the load weight on the truck 10 remains equal to 1500 pounds, and if a sensed object is located at a distance from the truck 10 within the second detection zone, then the maximum allowable vehicle speed may be, for example, 2 MPH. Hence, if the truck 10 is traveling at a speed greater than 2 MPH when the object is detected in the second detection zone, the controller 103 effects a speed reduction so that the vehicle speed is reduced to 2 MPH.

Keeping with the above example, if the load weight on the truck 10 equals 1,500 pounds and an object is sensed in the first detection zone, then a stop signal may be generated by the controller 103 to effect stopping of the truck 10.

The obstacle sensors may comprise ultrasonic transducers. Ultrasonic transducers are known to experience a phenomena known as transducer "ring down." Essentially "ring down" is the tendency of a transducer to continue to vibrate and transmit ultrasonic signals after the control signal that is used for initiating a transmitted signal has ceased. This "ring down" signal decreases in magnitude rather rapidly, but during the time that it is decreasing to a level below a threshold detection level, each obstacle sensor may respond by ignoring such "ring down" signals if the signals are above a reference level associated with that listening sensor. As a result, a sensor may mistake an object for a "ring down" signal and thus fail to identify an object in a corresponding detection zone. A common technique to avoid this problem is to blank out all return signals generated by the obstacle sensors for a preselected period of time after initiation of a transmission. The preselected time is determined based on various factors including the type of transducer that is used, but during this preselected time no valid returns can be sensed. If the obstacle sensors are positioned near a front 10A of the truck 10, see obstacle sensors 76A in FIG. 7, and if the blanking technique is used, this results in a "dead" or "non-detect" zone DZ existing immediately in front of the truck 10. Hence, if an object O is very near the front of the truck 10, e.g., 10 mm or less, and the obstacle sensors 76A are positioned at the front of the truck 10, see FIG. 7, then the object O may not be detected.

In the embodiment illustrated in FIGS. 6 and 8, first and second obstacle sensors 76A and 76B, respectively, are spaced apart from one another along a longitudinal axis $L_A$ of the truck 10, see FIG. 8. The first obstacle sensors 76A are positioned at the front 10A of the truck 10 and are capable of sensing objects located in, for example, the first, second and/or third detection zones. So as to ensure that objects O located in the non-detect zone DZ, which may be inherent in the first obstacle sensors 76A, the second obstacle sensors 76B are positioned on the truck 10 a spaced distance behind the first sensors 76A, i.e., in a direction away from the front 10A of truck 10, as best illustrated in FIG. 8. In this regard, the second sensors 76B function at least to sense objects in the dead zone DZ in FIG. 7.

Steer Correction

When a truck 10 is traveling in response to receiving a corresponding wirelessly transmitted travel request by the transmitter 70, e.g., while no person is riding on the truck 10 as described more fully herein, it is possible for the truck 10 to encounter obstacles that do not require the truck 10 to come to rest. Rather, a steer correction maneuver may be performed such that the truck 10 can continue to jog forward by the appropriate limited amount without requiring operator intervention.

According to aspects of the present invention, steer correction allows the truck 10 to automatically steer away from objects that are sensed to be in the general area of the front of the truck 10. This steer correction capability allows, for example, the truck 10, which may be traveling in response to a wirelessly received travel request from the transmitter 70, to stay generally in the center of an aisle in a warehouse environment as the truck 10 travels down the aisle. For example, it is possible that the truck 10 might have some drift in its steer angle because of steer calibration, floor crown, or any number of external factors. However, according to various aspects of the present invention, a truck 10 traveling in response to receiving a corresponding wirelessly transmitted travel request by the transmitter 70 may implement steer corrections, e.g., to stay away from or otherwise avoid walls and racks, other trucks, persons, boxes and other obstacles, etc., thus freeing the operator from the need to periodically remount the truck 10 and steer the truck 10 manually to the center of the aisle or other desired position and heading.

According to various aspects of the present invention, the controller 103 collects data from various sensors, e.g., 76, 76A, 76B that provide a picture of the landscape/environment in front of the truck 10, as will be discussed more fully herein. The controller 103 then uses data collected from the sensors to determine whether to implement steer correction maneuvers as described more fully herein. In this regard, steer correction may be implemented in addition to, in lieu of and/or in combination with other avoidance techniques described more fully herein. Thus, by way of illustration and not by way of limitation, steer correction may be utilized in combination with multiple speed zones, a stop detection zone, weight dependent speed zones, etc.

As a further example, the object detection components of the truck 10 may still implement an alarm and/or cause the truck 10 to stop, reduce or otherwise limit the maximum travel speed of the truck 10, etc. Still further, the truck 10 may issue a first alarm if the truck is attempting an automated steer correction maneuver and a second alarm or signal if the truck 10 is reducing speed and/or stopping in response to an object in a corresponding detection zone if such features are implemented in combination with steer correction.

In this regard, as used herein, the term "steer bumper zone" will be used to distinguish a zone utilized for steer correction from a "detection zone" which is utilized for maximum speed limiting, stopping the truck 10, etc., as described more fully above.

In an illustrative example, two steer bumper zone inputs are provided to the controller 103, to distinguish left and right orientations relative to the truck 10. However, depending upon the sensor technology and the manner in which sensor data is made available, one or more inputs to the controller 103 may be required. By way of illustration, and not by way of limitation, the truck 10 may be equipped with one or more sensing device(s) 76, 76A, 76B that collectively provide a first steer bumper zone and a second steer bumper zone, which are proximate to the truck 10. For example, the first steer bumper zone may be positioned to the left and generally towards the front of the forward traveling direction of the truck 10, to the left side of the truck 10, etc. Similarly, a second steer bumper zone may be positioned to the right and generally towards the forward traveling direction of the truck 10, to the right side of the truck 10, etc. In this regard, the first and second steer bumper zones of the truck 10 may be utilized to implement steer correction, which may include steer angle and steer direction components. In this illustrative configuration, the first and second steer bumper zones may be mutually exclusive, or portions of the first and second steer bumper zone may overlap, thus essentially providing a third steer bumper zone designated by the overlapping coverage of the first and second steer bumper zones.

Moreover, the first and second steer bumper zones may overlap substantially with, partially with or not overlap one or more detection zones utilized for other techniques such as speed control, obstacle triggered braking and stopping of the truck 10, etc. For example, the range of the steer bumper zones may be similar to or different from the range of one or more detection zones if speed limiting control or other features are also implemented along with steer correction as described in greater detail herein.

Moreover, the sensing inputs provided to the controller 103 may be derived from a variety of similar type sensors or via a mix of different sensor technologies, e.g., ultrasonic sensors and/or laser scanner sensors. In this regard, various sensors and/or sensor technology types, e.g., laser scanning and ultrasonic may be used in conjunction or cooperation with each other, e.g., to utilize one or more sensor(s) or sensor technologies for one or more zones (detection and/or steer bumper) and to utilize yet another one or more sensor(s) or sensor technologies for one or more different zones (detection and/or bumper). As another example, two or more sensors or sensor technologies can provide redundancy, e.g., as a fail-safe, backup or confirmation set of data.

According to further aspects of the present invention, the controller 103 may be configured to process additional data beyond the two steer bumper zone inputs, examples of which may include object detection angle and distance data, etc. Thus, the techniques described herein are not limited to only two steer bumper zones.

Thus, steer correction according to aspects of the present invention provides an aid to the operator by maintaining the truck 10 away from walls, racks, other vehicles, or other obstructions as the truck 10 is operated by the remote wireless control device 70.

Figure 9:
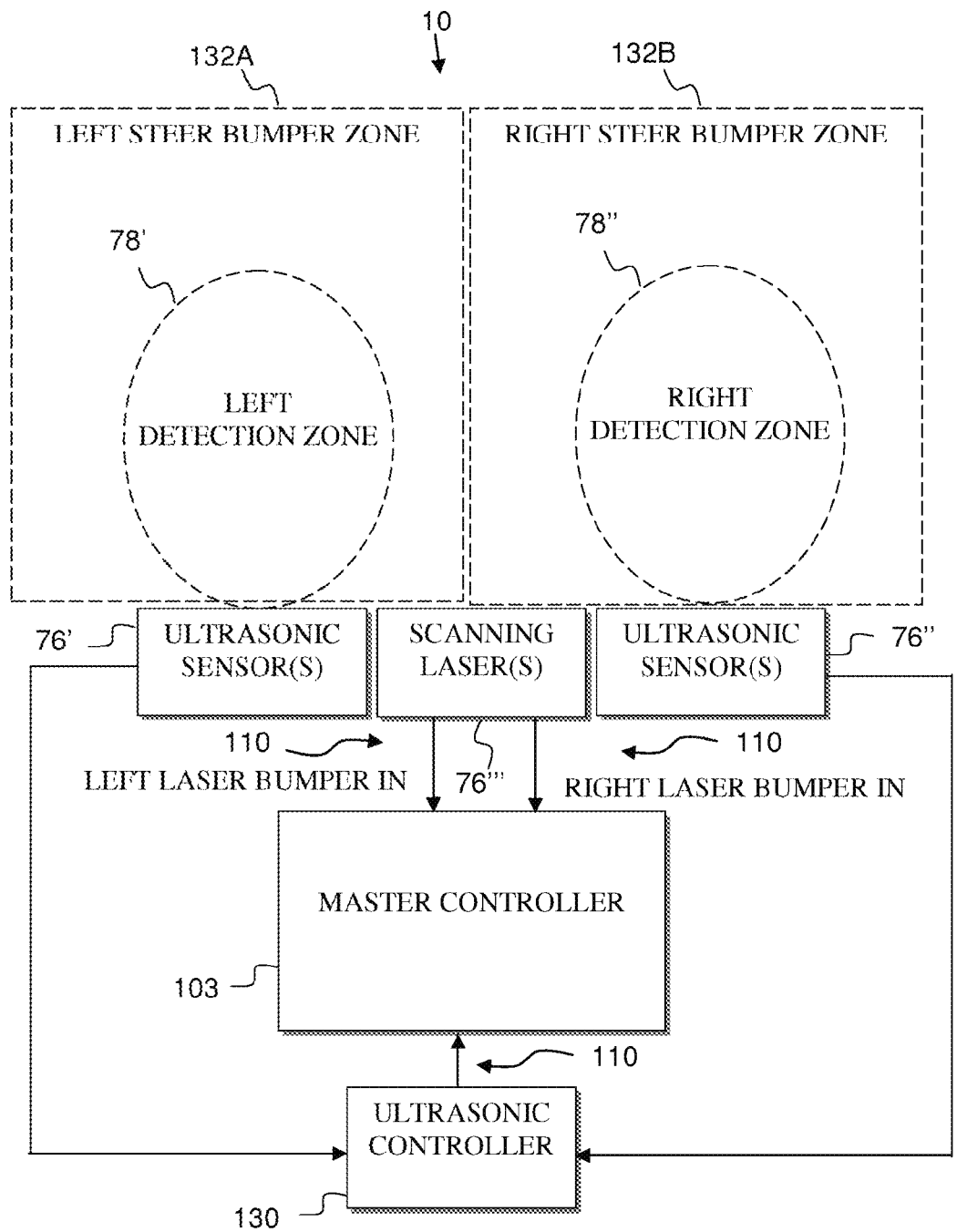
FIG. 9 is a schematic block diagram of a control system of a materials handling vehicle that is coupled to sensors for detecting objects in the travel path of the vehicle according to various aspects of the present invention.

According to various aspects of the present invention, a control system in a truck 10 provides steer correction control according to various aspects of the present invention. Referring to FIG. 9, a partial schematic view of the control system is illustrated. In the illustrated system, a first ultrasonic sensor 76' is utilized to generate a first detection zone 78', which is also designated herein as a left detection zone. Correspondingly, a second ultrasonic sensor 76" is utilized to generate a second detection zone 78", which is also designated herein as a right detection zone. Moreover, although only two ultrasonic detection zones are illustrated, it should be understood that any number of detection zones may be implemented. Still further, as described more fully herein, the implemented detection zones may overlap or define discrete, mutually exclusive zones.

The output of each ultrasonic sensor 76', 76" is coupled to an ultrasonic controller 130, which is utilized, where required by the specific ultrasonic technology, to process the output of the ultrasonic sensors 76', 76". The output of the ultrasonic controller 130 is coupled, for example, as an input to the controller 103. The controller 103 may process the outputs of the ultrasonic sensor controller 130 to implement speed control, obstacle avoidance or other features, examples of which are set out in greater detail herein.

Also illustrated, a sensor 76''', which is illustrated as a scanning laser sensor to further illustrate exemplary configurations. In this example, the sensor 76''' is utilized to generate a first steer bumper zone 132A, also designated as a left steer bumper zone, and a second steer bumper zone 132B, also designated as a right steer bumper zone. For example, the scanning laser sensor 76''' may sweep a laser beam in an area in front of truck 10. In this regard, multiple laser systems may be utilize, or one or more laser beams may be swept, e.g., to raster scan one or more areas forward of the truck 10. In this regard, the laser sensor may independently define and scan the left and right steer bumper zones, or the controller 103 may derive the left and right steer bumper zones based upon the raster scan of the laser(s). Still further, alternate scanning patterns may be utilized, so long as the controller 103 can determine whether a detected obstacle is to the left or to the right of the truck 10.

As a few additional examples, although a laser scanner is illustrated for purposes of discussion herein, other sensing technologies may be utilized, examples of which may include ultrasonic sensors, infrared sensors, etc. For example, ultrasonic sensors located to the sides of the truck 10 may define the left and right steer bumper zones 132A, 132B and other ultrasonic sensors may be used to define detection zones, e.g., for speed limiting, etc.

As illustrated, the output of the laser scanner 76''' provides two inputs 110 into the controller 103. A first signal designates whether an object is detected in the left steer bumper zone. Correspondingly, a second signal designates whether an object is detected in the right steer bumper zone. Depending upon the sensor and sensor processing technologies utilized, the input(s) to the controller 103 designating an object in the steer bumper zones 132A, 132B may be in other formats. As yet a further illustration, the first and second laser steer bumper zones 132A, 132B may be defined by both ultrasonic sensors and a scanning laser. In this example, the scanning laser is utilized as a redundant check to verify that the ultrasonic sensors properly detect an object in either the left or right steer bumper zones 132A, 132B. As yet a further example, ultrasonic sensors may be utilized to detect an object in the left or right steer bumper zones 132A, 132B, and the scanning laser may be utilized to distinguish or otherwise locate the object to determine whether the object was detected in the left steer bumper zone or the right steer bumper zone. Other arrangements and configurations may alternatively be implemented.

Algorithm

Figure 10:
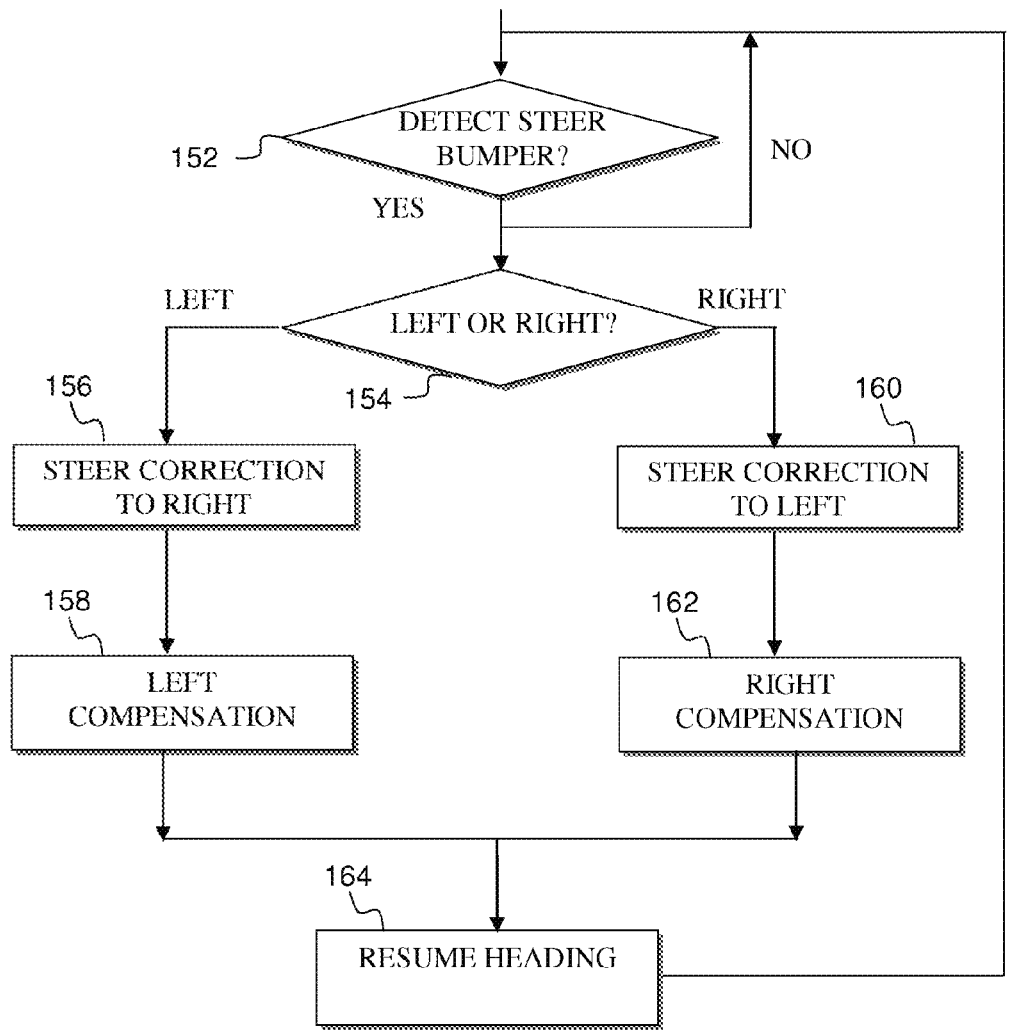
FIG. 10 is a flow chart of a method of implementing steer correction according to various aspects of the present invention.

According to various aspects of the present invention, a steer correction algorithm is implemented, e.g., by the controller 103. Referring to FIG. 10, a steer correction algorithm comprises determining whether a steer bumper zone warning is detected at 152. A steer bumper signal warning at 152 may comprise, for example, detecting the presence of an object within the first and/or second steer bumper zones 132A, 132B. If a steer bumper zone warning is received, a determination is made at 154 whether the steer bumper zone warning indicates that an object is detected to the right or to the left of the truck 10, e.g., whether the detected object is in the first steer bumper zone 132 or the second steer bumper zone 132B. For example, with brief reference back to FIG. 9, a laser scanner sensor 76''' may generate two outputs, a first output signal designating whether an object is detected in the first (left) steer bumper zone 132A, and a second signal designating whether an object is detected in the second (right) steer bumper zone 132B. Alternatively, the controller 103 may receive raw laser scanner data and process/distinguish the first and second steer bumper zones 132A, 132B using a predetermined mapping.

If a steer bumper zone warning designates that an object is detected in the left steer bumper zone 132A, then a steer correction routine is implemented at 156 that includes computing a steer angle correction to steer the truck 10 to the right according to a first set of parameters. By way of illustration and not by way of limitation, a steer right correction implemented at 156 may include steering the truck 10 to the right at a right direction steer angle. In this regard, the right direction steer angle may be fixed or variable. For example, the controller 103 may command the steer controller 112 to ramp up to some desired steer angle, e.g., 8-10 degrees to the right. By ramping up to a fixed steer angle, sudden changes in the angle of the steer wheel(s) will not occur, resulting in a smoother performance. The algorithm accumulates the distance traveled at the steer correction angle, which may be a function of how long the appropriate steer bumper input is engaged.

According to various aspects of the present invention, the steered wheel angular change may be controlled to achieve, for example, a substantially fixed truck angle correction as a function of accumulated travel distance. The travel distance accumulated while performing a steer correction maneuver may be determined based upon any number of parameters. For example, the distance traveled during the steer correction may comprise the distance traveled by the truck 10 until the detected object is no longer within the associated left bumper detection zone 132A. The accumulated travel distance may also/alternatively comprise, for example, traveling until a time out is encountered, another object is detected in any one of the bumper or detection zones, a predetermined maximum steer angle is exceeded, etc.

Upon exiting a right steer correction at 156, e.g., by maneuvering the truck 10 so that no object is detected within the left steer bumper detection zone 132A, a left steer compensation maneuver is implemented at 158. The left steer compensation maneuver at 158 may comprise, for example, implementing a counter steer to adjust the travel direction of the truck 10 to an appropriate heading. For example, the left steer compensation maneuver may comprise steering the truck 10 at a selected or otherwise determined angle for a distance that is a percentage of the previously accumulated travel distance. The left steer angle utilized for the left steer compensation maneuver may be fixed or variable, and may be the same as, or different from the steer angle utilized to implement the right steer correction at 156.

By way of illustration and not by way of limitation, the distance utilized for the left steer compensation maneuver at 158 may be approximately one quarter to one half of the accumulated travel distance while implementing the right steer correction at 156. Similarly, the left steer angle to implement the left steer compensation maneuver may be approximately one half of the angle utilized to implement the right steer correction at 156. Thus, assume that the right steer angle is 8 degrees and the accumulated steer correction travel distance is 1 meter. In this example, the left steer compensation may be approximately one half of right steer correction, or −4 degrees, and the left steer compensation will occur for a travel distance of approximately ¼ meters to ½ meters.

The particular distance and/or angle associated with the left steer compensation maneuver at 158 may be selected, for example, so as to dampen the "bounce" of the truck 10 as the truck 10 moves along its course to steer correct away from detected obstacles. As an illustration, if the truck 10 steer corrects at a fixed degree per distance traveled, the controller 103 may be able to determine how much the corresponding truck angle has changed, and therefore, adjust the left steer compensation maneuver at 158 to correct back towards the original or other suitable heading. Thus, the truck 10 will avoid "ping ponging" down an aisle and instead, converge to a substantially straight heading down the center of the aisle without tedious manual repositioning required by the truck operator. Moreover, the left steer compensation maneuver at 158 may vary depending upon the particular parameters utilized to implement the right steer correction at 156.

Correspondingly, if a steer bumper zone warning designates that an object is detected in the right steer bumper zone 132B, then a steer correction routine is implemented at 160 that includes computing a steer angle correction to steer the truck 10 to the left according to a second set of parameters. By way of illustration and not by way of limitation, a steer left correction implemented at 160 may include steering the truck 10 to the left at a left steer angle. In this regard, the left steer correction maneuver at 160 may be implemented in a manner analogous to that described above at 156, except that the correction is to the right at 156 and to the left at 160.

Similarly, upon exiting a left steer correction at 160, e.g., by maneuvering the truck 10 so that no object is detected within the right bumper detection zone 132B, a right steer compensation maneuver is implemented at 162. The right steer compensation maneuver at 162 may comprise, for example, implementing a counter steer to adjust the travel direction of the truck 10 to an appropriate heading in a manner analogous to that described at 158, except that the steer compensation maneuver at 158 is to the left and the steer compensation maneuver at 162 is to the right.

After implementing the steer compensation maneuver at 158 or 162, the truck may return to a substantially straight heading, e.g., 0 degrees at 164 and the process loops back to the beginning to wait for the detection of another object in either of the steer bumper zones 132A, 132B.

The algorithm can further be modified to follow various control logic implementations and/or state machines to facilitate various anticipated circumstances. For example, it is possible that a second object will move into either steer bumper zone 132A or 132B while in the process of implementing a steer compensation maneuver. In this regard, the truck 10 may iteratively attempt to steer correct around the second object. As another illustrative example, if object(s) are simultaneously detected in both the left and right steer bumper zones 132A, 132B, the controller 103 may be programmed to maintain the truck 10 at its current heading (e.g., zero degree steer angle), until either one or more steer bumper zones 132A, 132B are cleared or the associated detection zones cause the truck 10 to come to a stop.

According to further aspects of the present invention, a user and/or service representative may be able to customize the response of the steer angle correction algorithm parameters. For example, a service representative may have access to programming tools to load customized variables, e.g., in the controller 103, for implementing steer correction. As an alternative, a truck operator may have controls that allow the operator to input customized parameters into the controller, e.g., via potentiometers, encoders, a software user interface, etc.

The output of the algorithm illustrated in FIG. 10 may comprise, for example, an output that defines a steer correction value that may be coupled from the controller 103 to an appropriate control mechanism of the truck 10. For example, the steer correction value may comprise a +/− steer correction value, e.g., corresponding to steer left or steer right, that is coupled to a vehicle control module, steer controller 112, e.g., as illustrated in FIG. 2, or other suitable controller. Still further, additional parameters that may be editable, e.g., to adjust operational feel may comprise the steer correction angle, a steer correction angle ramp rate, a bumper detection zone size/range for each steer bumper zone, truck speed while steer correcting, etc.

Figure 11:
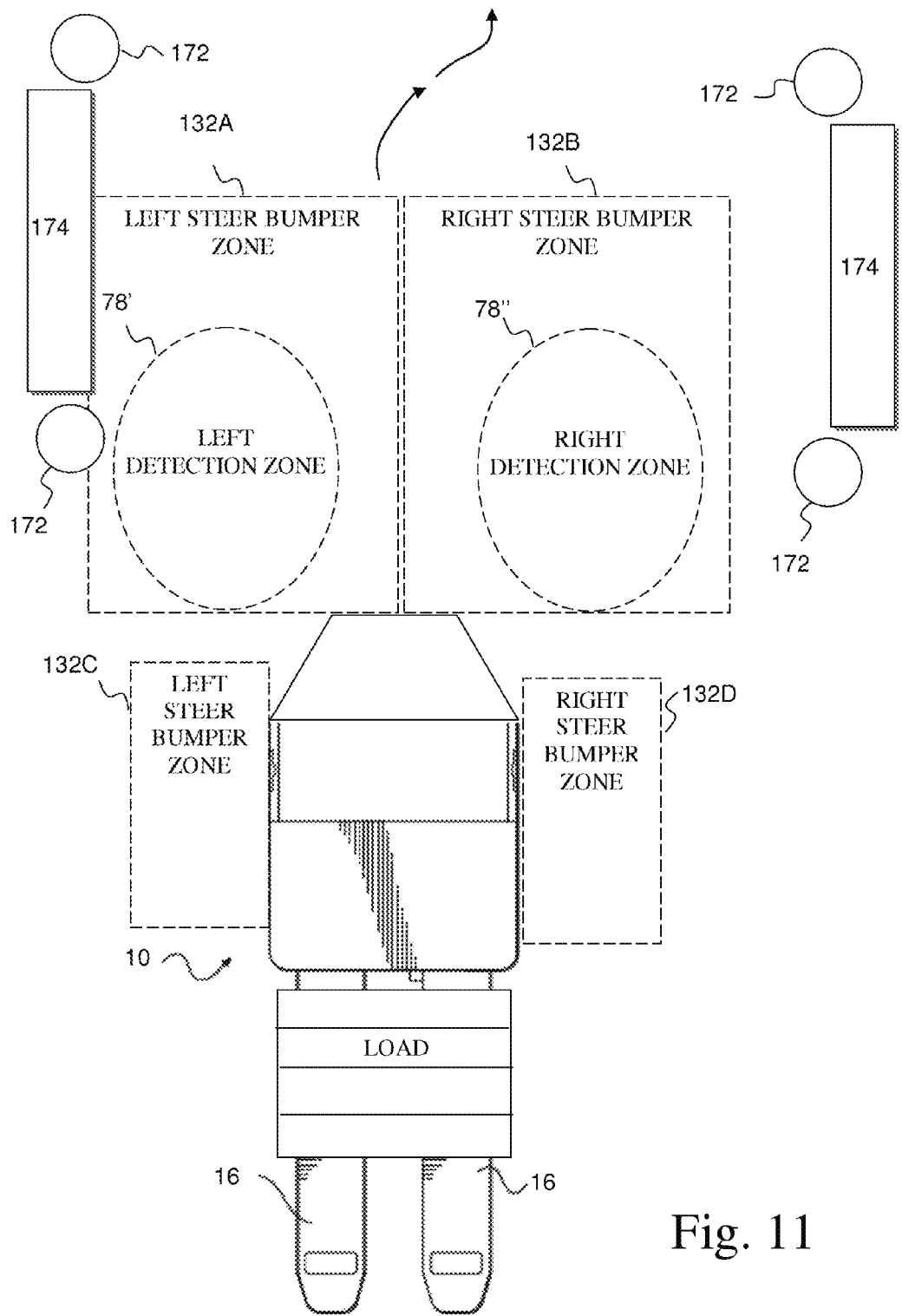
FIG. 11 is a schematic illustration of a materials handling vehicle traveling down a narrow warehouse aisle under remote wireless operation, which is automatically implementing a steer correction maneuver according to various aspects of the present invention.

Referring to FIG. 11, assume in the illustrative example, that the truck 10 is traveling in response to receiving a remote wireless travel request and that before the truck 10 can travel a predetermined jog distance, the truck 10 travels into a position where a rack leg 172 and a corresponding pallet 174 are in the path of the left steer bumper zone 132A. Keeping with the exemplary algorithm of FIG. 10, the truck 10, e.g., via the controller 103, may implement an obstacle avoidance maneuver by entering a steer correction algorithm, to steer the truck to the right. For example, the controller 103 may compute or otherwise lookup or retrieve a steer correction angle that is communicated to a steer controller 112 to turn the drive wheel(s) of the truck 10.

The truck 10 maintains steer correction until an event occurs, such as the disengagement of the object, e.g., when the scanning laser or other implemented sensor technology no longer detects an object in the left steer bumper zone 132. Assume that the truck 10 accumulated a travel distance of one half of a meter during the steer correction maneuver, which was fixed at 8 degrees. Upon detecting that the left steer bumper zone signal has disengaged, a counter steer compensation is implemented to compensate for the change in heading caused by the steer correction. By way of example the steer compensation may steer the truck 10 to the left for approximately one quarter meter accumulated travel distance, at 4 degrees. For very narrow aisles, the Left/Right steer bumper zone sensors may provide very frequent inputs/little time between senses compared to relatively wider aisles.

The various steer angle corrections and corresponding counter steer compensations may be determined empirically, or the angles, ramp rates, accumulated distances, etc., may be computed, modeled or otherwise derived.

In the illustrative arrangement, the system will try to maintain the truck 10 centered in the aisle as the truck 10 advances in response to receiving a corresponding wirelessly transmitted travel request by the transmitter 70. Moreover, bounce, e.g., as measured by the distance from the centerline of a warehouse aisle, is damped. Still further, there may be certain conditions where the truck 10 may still require some operator intervention in order to maneuver around certain objects in the line of travel.

Figure 12:
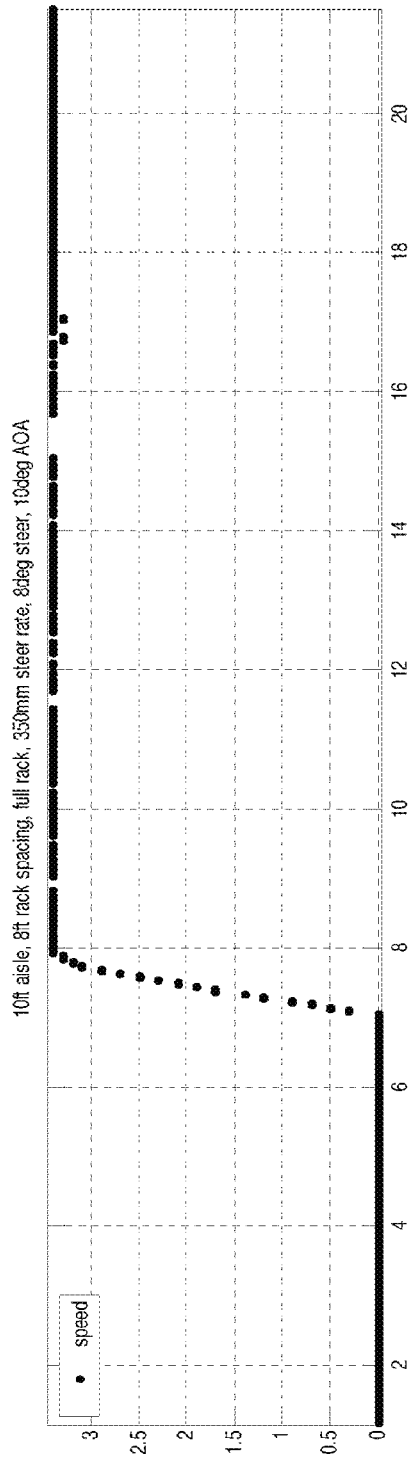
FIG. 12 is a graph illustrating an exemplary speed of a materials handling vehicle implementing a steer correction maneuver under remote wireless operation according to various aspects of the present invention.
Figure 13:
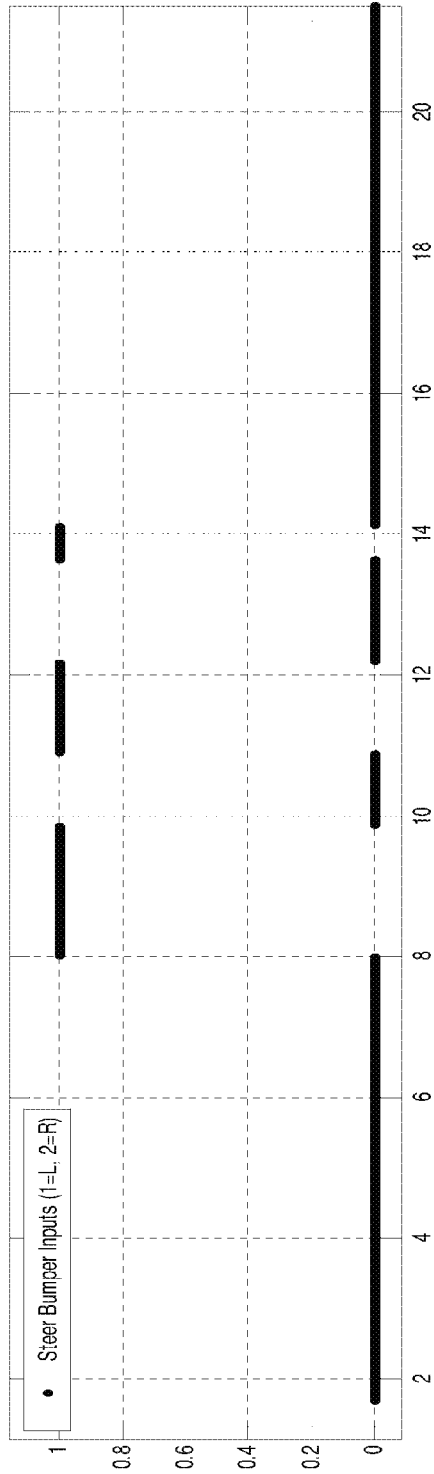
FIG. 13 is a graph illustrating exemplary steer bumper input data to a controller, which illustrates whether an object is sensed in the left or right steer bumper zones, according to various aspects of the present invention.
Figure 14:
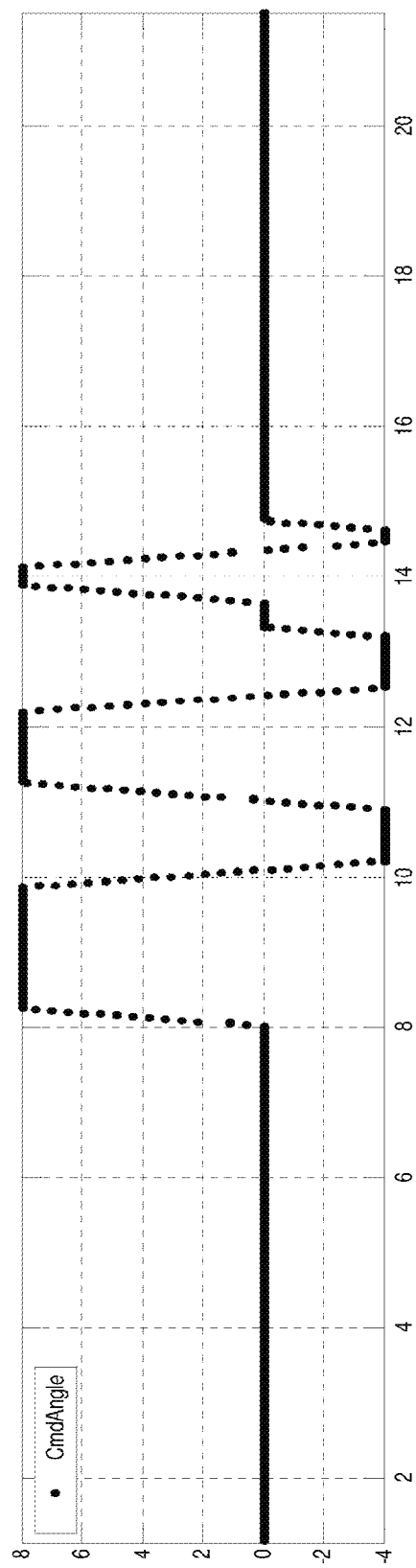
FIG. 14 is a graph illustrating exemplary steer correction in degrees to illustrate an exemplary and illustrative steer correction maneuver applied to a materials handling vehicle under remote wireless operation according to various aspects of the present invention.

Referring to FIG. 12, a graph illustrates a speed measurement of the truck 10 during an obstacle avoidance maneuver. The graph in FIG. 13 illustrates a steer correction at the predetermined steer angle to illustrate a total correction applied by the algorithm. And a graph in FIG. 14 illustrates motion of the truck 10 as a function of when steer correction is active and when an object is sensed in the left and/or right bumper detection zones.

According to further aspects of the present invention, the steer correction algorithm may be configured to hug a wall/rack, versus staying away from a wall and/or rack. For example, adding a small drift to the truck 10 will allow the truck 10 to maintain a distance with a small amount of control-related ripple on its distance to the fixed wall/rack.

Although the left and right steer bumper zones 132A, 132B are illustrated at least partially in front of the forward traveling direction of the truck 10, other arrangements may be alternatively and/or additionally be implemented. For example, the left and right steer bumper zones could alternatively be positioned towards the sides of the truck 10, e.g., as illustrated by left and right side steer bumper zones 132C, 132D. Also, the truck 10 may utilize a first pair of left and right steer bumper zones towards the forward traveling direction of the truck 10, e.g., left and right steer bumper zones 132A, 132B, and a second pair of left and right steer bumper zones 132C, 132D towards the sides of the truck 10. In this regard, the particular algorithm utilized to implement steer correction may be the same or different for each pair of steer bumper zones.

As an example, side steer bumper zones 132C, 132D may be utilized to maintain the truck 10 generally adjacent to a rack, wall or other heading. In this regard, a multi-zone steer bumper may be used, e.g., to establish a hysteresis, e.g., such that the controller 103 maintains a heading by keeping the wall, rack or other structure between a first, outer steer bumper limit and a second, inner steer bumper limit. As yet another illustrative alternative, assume that the truck is to stay just to the right of a rack or other structure, which is to the left of the truck 10. The truck 10 can automatically steer to the left by a small amount so as to steer towards the structure. In this regard, when the left steer bumper zone 132C is breached by the structure, the steer correction described more fully herein will steer away from the structure. However, because the steering is configured to steer just slightly to the left, the truck 10 will eventually travel towards the structure until the steer correction again repositions the truck 10. As yet another illustrative example, the steer compensation, e.g., 158 in FIG. 10, could be made to deliberately overcompensate, thus maintaining the truck 10 adjacent to the structure.

As yet another illustrative example, the steer bumper zones may be comprised of multiple steer bumper sub-zones, where each sub-zone may be associated with different parameters for steer correction, e.g., to allow subtle steer correction for objects sensed further away from the truck 10 than objects sensed more closely to the truck 10. By way of example, the steer correction may be a lesser amount, e.g., 2 degrees, when an object is detected in the furthest region or sub-zone from the vehicle; an intermediate amount, e.g., 4 degrees, when an object is detected in a middle region; and a greater amount, e.g., 8 degrees, when an object is detected in an inner region of a steer bumper zone. As further alternatives, distance measurement to the detected object may be utilized to dynamically adjust the steer algorithm to make appropriate steer correction maneuvers.

As yet another illustrative example, it may be desirable to apply a first, greater amount of steer correction, e.g., 10 degrees, if certain predefined conditions are met, and to apply a second, lesser amount of steer correction, e.g., 7 degrees, under all other circumstances. For example, assume that an operator is driving the truck 10 and comes to the end of an aisle or row. The operator then maneuvers the truck 10 by making a 180 degree turn and enters an adjacent aisle. Perhaps the operator over or under steers upon entering the adjacent aisle, such that the heading of the truck 10 cannot be straightened down the aisle with the second, lesser amount of steer correction. In this situation, it may be desirable to apply a greater amount of steer correction than is normally used to allow the truck 10 to achieve a straight heading down the aisle.

The conditions that must occur prior to applying the greater amount of steer correction may vary, but in the above example, may comprise the following: a first condition may be that a preselected driving speed, such as, for example, 3 MPH, must be reached or exceeded. A second condition may be that a minimum steering angle, such as, for example, 45 degrees, must be met or exceeded. A third condition may be that an operator must be present on the truck 10 during the occurrences of the first and second conditions. In the above example, if each of these three conditions is met, the controller 103 performs a single instance of the greater amount of steer correction, e.g., 10 degrees, if an object is detected in one of the steer bumper zones after the occurrence of the three conditions. Subsequent steer corrections applied would be the lesser amount, e.g., 7 degrees, until all three conditions are once again met, in which case another single instance of the greater amount of steer correction will be applied by the controller 103.

Figure 15A:
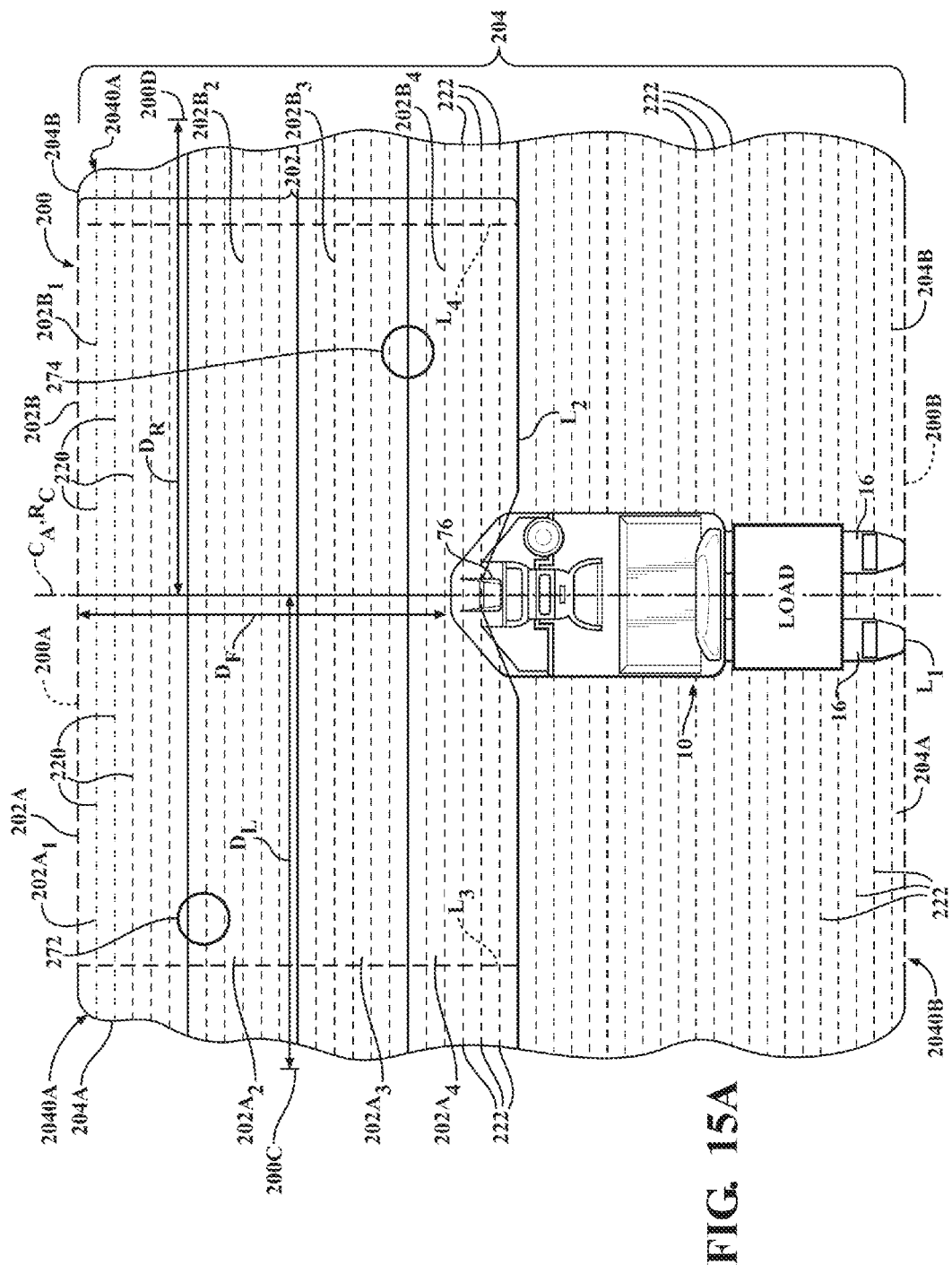
FIGS. 15A-15C are schematic illustrations of an exemplary environment used in connection with object tracking in a materials handling vehicle traveling under remote wireless operation according to various aspects of the present invention.
Figure 15B:
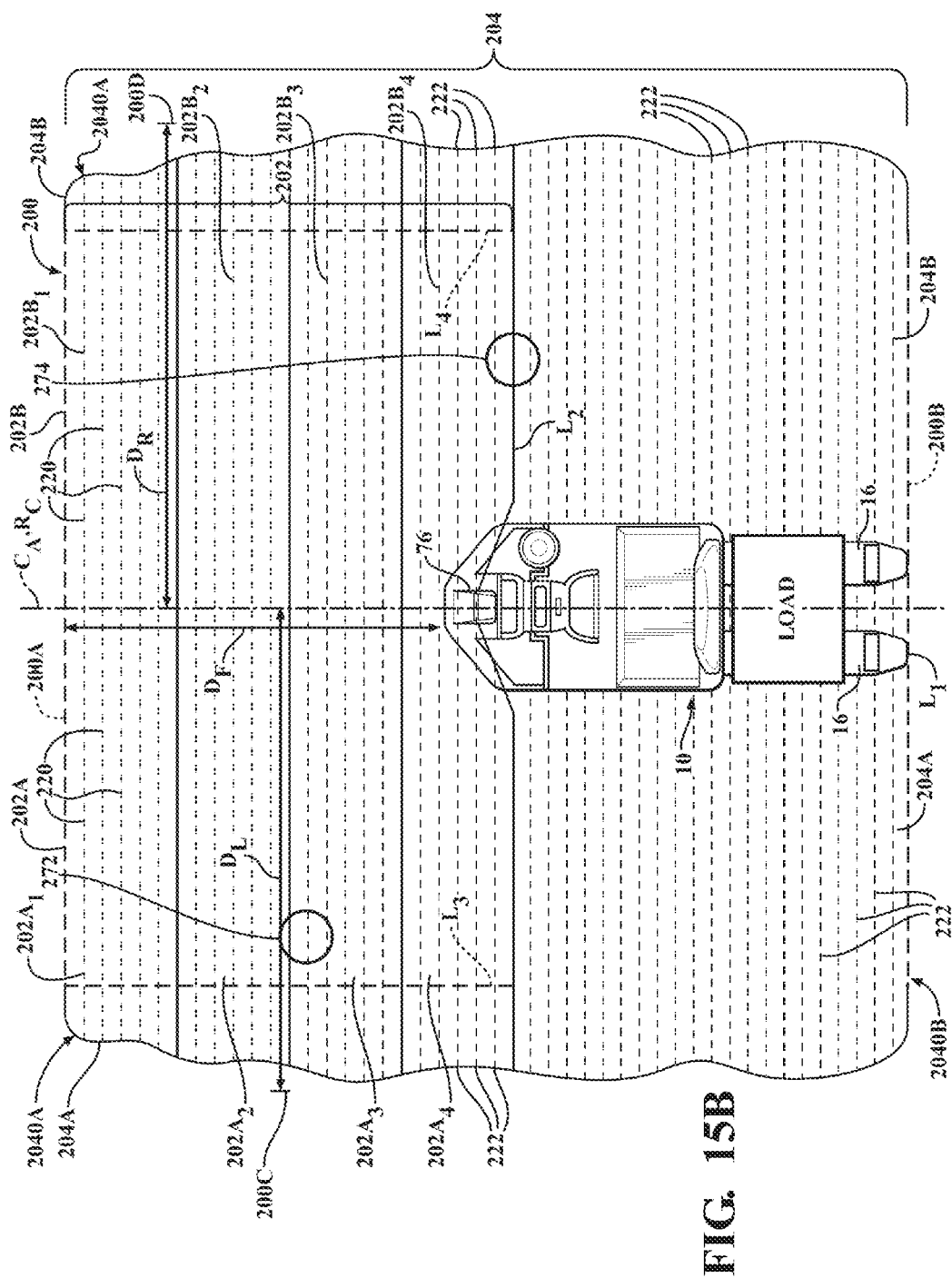
Figure 15C:
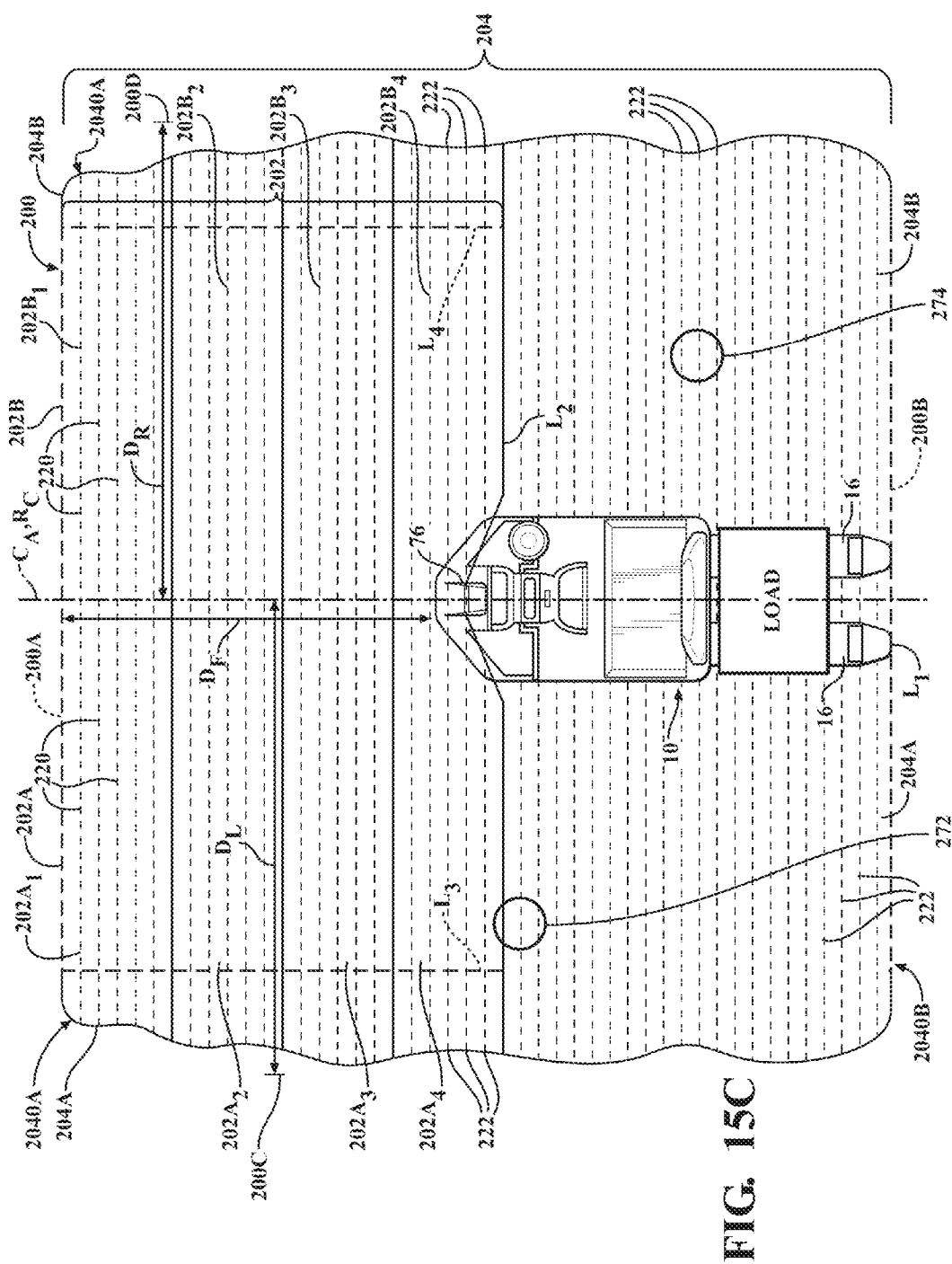

Referring to FIGS. 15A-15C, a scanned environment 200, also referred to as a landscape, is illustrated. The environment 200 may be derived by the controller 103 based on sensor data obtained by the controller 103 from an obstacle sensor 76, such as a laser scanning device. In this embodiment, a single obstacle sensor 76 is used to provide the sensor data, although additional sensors 76 could be used as desired. In an exemplary embodiment, the obstacle sensor 76 may be located at a distance off the floor upon which the truck 10 is travelling, wherein the obstacle sensor 76 scans in a scanning plane that is oriented at an angle from the sensor 76 downward toward the floor.

The exemplary environment 200 illustrated in FIGS. 15A-15C extends in an axial direction, i.e., parallel to a central axis $C_A$ of the truck 10, from a front edge 200A of the environment 200 to a rear edge 200B of the environment 200. The front edge 200A is displaced a predefined distance $D_F$ from the front of the truck 10. The distance $D_F$ may be any suitable distance and in a preferred embodiment is from about 1 meter to about 5 meters. The rear edge 200B is located at a predetermined location $L_1$ associated with the truck 10. As a few non-limiting examples, the location $L_1$ may be defined at a load wheel of the truck 10, at a rear end of an estimated position of a typical load carried by the truck 10, or at the tips of the forks 16, as illustrated in FIGS. 15A-15C.

The exemplary environment 200 in the embodiment shown in FIGS. 15A-15C extends in a lateral direction, i.e., perpendicular to the central axis $C_A$ of the truck 10, from a left edge 200C of the environment 200 to a right edge 200D of the environment 200. The left edge 200C is displaced laterally a predefined distance $D_L$ to the left of the central axis $C_A$ of the truck 10. The right edge 200D is displaced laterally a predefined distance $D_R$ to the right of the central axis $C_A$ of the truck 10. The distances $D_L$ and $D_R$ may comprise any suitable distances and in a preferred embodiment are each from about 2 meters to about 5 meters. It is noted that the distances $D_L$ and $D_R$ could be measured from the sides of the truck 10 or any other suitable location, rather than from the central axis $C_A$. It is also noted that the edges 200A-200D of the environment 200 could comprise a shape and need not define straight edges. For example, the edges 200A-200D could be curved or could comprise uneven or serrated portions.

The exemplary environment 200 illustrated in FIGS. 15A-15C comprises a scanned zone 202 and a history zone 204. The scanned zone 202 is actively scanned by the obstacle sensor 76 during operation of the truck 10. The history zone 204 is not actively scanned by the obstacle sensor 76, but objects that are detected in the scanned zone 202 are capable of being tracked as they pass through the history zone 204 during movement of the truck 10, as will be described herein. The history zone 204 comprises a first portion 2040A comprising unscanned areas laterally outside of the scanned zone 202 and also comprises a second portion 2040B comprising an area that is located rearwardly from the scanned zone 202, as shown in FIGS. 15A-15C.

The scanned zone 202 extends from the front edge 200A of the environment 200 to a predetermined axial location $L_2$, which location $L_2$ in the embodiment shown is defined close to the front end of the truck 10 but could be defined at other areas. The scanned zone 202 extends in the lateral direction between predetermined lateral locations $L_3$ and $L_4$, which locations $L_3$ and $L_4$ are laterally displaced from respective sides of the truck 10 and are located between the sides of the truck 10 and the left and right edges 200C and 200D of the environment 200, as shown in FIGS. 15A-15C.

The first portion 2040A of the history zone 204 extends laterally outwardly from both sides of the scanned zone 202, i.e., from the respective locations $L_3$ and $L_4$, to the left and right edges 200C and 200D of the environment 200. The second portion 2040B of the history zone 204 extends rearwardly from the scanned zone 202, i.e., from the location $L_2$, to the rear edge 200B of the environment 200. The second portion 2040B of the history zone 204 extends laterally between the left and right edges 200C and 200D of the environment 200.

The scanned zone 202 and the history zone 204 each comprise corresponding left and right sections 202A, 202B and 204A, 204B. The left section 202A of the scanned zone 202 in the embodiment shown comprises four scan zones $202A_1$, $202A_2$, $202A_3$, $202A_4$ (collectively referred to hereinafter as scan zones $202A_{1-4}$) and the right section 202B of the scanned zone 202 in the embodiment shown comprises four scan zones, $202B_1$, $202B_2$, $202B_3$, $202B_4$ (collectively referred to hereinafter as scan zones $202B_{1-4}$). The exemplary scan zones $202A_{1-4}$-$202B_{1-4}$ illustrated in FIGS. 15A-15C are substantially all the same size and are generally rectangular in shape, with the exception of the scan zones $202A_4$ and $202B_4$ located closest to the truck 10 having angled bottom corner portions. However, it is noted that the scan zones $202A_{1-4}$-$202B_{1-4}$ could have any suitable size and shape. Further, while the scan zones $202A_4$ and $202B_4$ located closest to the truck 10 in the embodiment shown extend slightly rearwardly from the front of the truck 10, i.e., to the location $L_2$, the scan zones $202A_4$ and $202B_4$ located closest to the truck 10 could extend to other locations without departing from the spirit and scope of the invention. Also, while each section 202A, 202B of the scanned zone 202 in the embodiment shown comprises four scan zones $202A_{1-4}$-$202B_{1-4}$, additional or fewer scan zones may be provided in each section 202A, 202B.

The obstacle sensor 76 scans the scan zones $202A_{1-4}$-$202B_{1-4}$ and sends sensor data to the controller 103 regarding objects detected in the scan zones $202A_{1-4}$-$202B_{1-4}$. Included in the sensor data sent by the obstacle sensor 76 is data for each scan zone $202A_{1-4}$-$202B_{1-4}$ that is representative of whether an object is detected in the corresponding scan zone $202A_{1-4}$-$202B_{1-4}$. Further, if an object is detected in a scan zone $202A_{1-4}$-$202B_{1-4}$, the sensor data includes data representative of the distance that the detected object is from a reference coordinate $R_C$ associated with the vehicle. The reference coordinate $R_C$ may be a predetermined location on the truck 10, such as a bumper, wheel, fork, the obstacle sensor 76, etc., or the reference coordinate $R_C$ may be an axis or plane associated with the truck 10. In the embodiment shown, the reference coordinate $R_C$ is the central axis $C_A$ of the truck 10.

As shown in FIGS. 15A-15C, each scan zone $202A_{1-4}$-$202B_{1-4}$ comprises a plurality of buckets 220. The buckets 220 are used for tracking objects in a plane generally parallel to the floor and that are detected in the scan zones $202A_{1-4}$-$202B_{1-4}$, as will be discussed herein. In a preferred embodiment, each scan zone $202A_{1-4}$-$202B_{1-4}$ comprises between four and eleven buckets 220 (six buckets 220 are included in each scan zone $202A_{1-4}$-$202B_{1-4}$ in the embodiment shown), although additional or fewer buckets 220 could be included in each scan zone $202A_{1-4}$-$202B_{1-4}$.

The history zone 204 also comprises a plurality of buckets 222. The buckets 222 in first portion 2040A of the history zone 204 may be continuations of the buckets 220 from the scan zones $202A_{1-4}$-$202B_{1-4}$. The buckets 222 are used for tracking objects that enter the history zone 204 from the scan zones $202A_{1-4}$-$202B_{1-4}$ as will be discussed herein.

First and second objects 272, 274 are illustrated in the environment 200 in FIGS. 15A-15C. These objects 272, 274 are detected by the obstacle sensor 76 during operation, and the obstacle sensor 76 sends sensor data to the controller 103 about the objects 272, 274. The controller 103 uses the sensor data to assign the objects 272, 274 to buckets 220 defined within the scanned zone 202 based on the sensor data from the obstacle sensor 76. Once the objects 272, 274 exit the scanned zone 202 and enter the history zone 204, the objects 272, 274 are assigned to the buckets 222 in the history zone 204.

The buckets 220, 222 are used to track the objects 272, 274 in the environment 200 as the truck 10 moves. That is, as the truck 10 moves, the controller 103 tracks the objects 272, 274 by using subsequent sensor data from the obstacle sensor 76 to re-assign the objects 272, 274 to adjacent buckets 220, and/or by using dead reckoning to re-assign the objects 272, 274 to adjacent buckets 220, 222. By re-assigning the objects 272, 274 to adjacent buckets 220, 222, the controller 103 is able to determine an updated axial distance that the objects 272, 274 are from the truck 10. The controller 103 is also able to determine an updated lateral distance that the objects 272, 274 are from the truck 10 using subsequent sensor data and/or dead reckoning. In a preferred embodiment, the objects 272, 274 are tracked by the controller 103 until they are no longer determined to be in the environment 200.

It is noted that, if the obstacle sensor 76 scans in a scanning plane that is oriented at an angle from the sensor 76 downward toward the floor, some objects that are detected in one or more of the scan zones $202A_{1-4}$-$202B_{1-4}$ may not be detected in an adjacent scan zone, even though that object is located within the axial dimension of the adjacent scan zone. For example, shorter objects may be detected by the obstacle sensor 76 in scan zone $202A_1$, but may not be detected by the obstacle sensor 76 upon entering the axial dimensions of the adjacent zone $202A_2$. While the sensor data provided by the obstacle sensor 76 may not indicate that the object is in the zone $202A_2$, i.e., since the object is located under the scanning plane of the sensor 76, the object is still tracked in the environment 200 via dead reckoning.

Figure 16B:
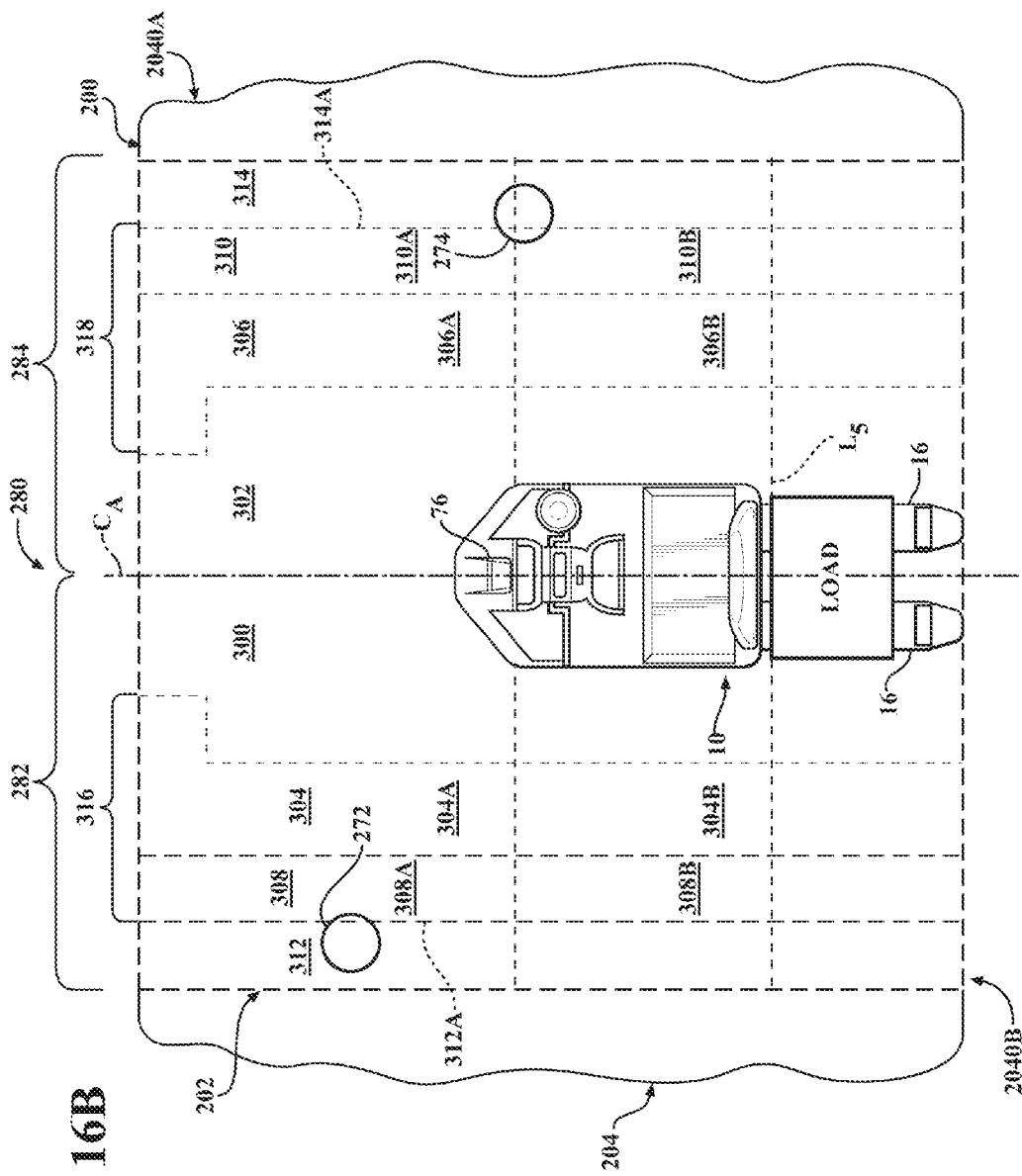
Figure 16C:
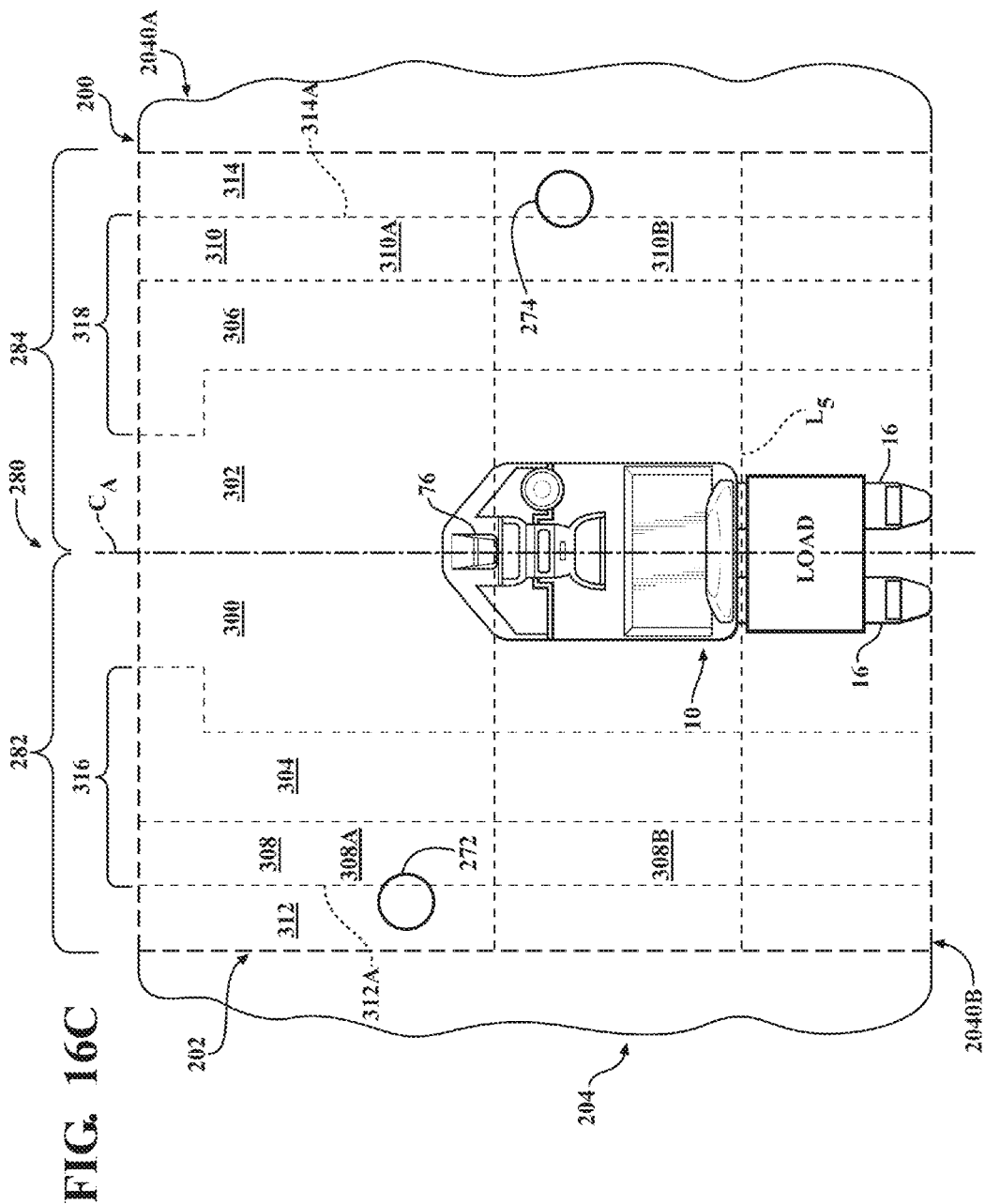

Referring to FIGS. 16A-16C, exemplary action zones 280 defined within the environment 200 are illustrated. The action zones 280 may be used for implementing various steer maneuvers as will be described herein. The action zones 280 in the embodiment shown are divided into left and right action zones 282, 284, wherein the left action zone 282 is located on the left of the central axis $C_A$ of the truck 10, and the right action zone 284 is located on the right of the central axis $C_A$ of the truck 10.

The exemplary action zones 280 illustrated in FIGS. 16A-16C comprise left and right stop zones 300, 302, left and right no steer zones 304, 306, left and right steer zones 308, 310, and left and right hug zones 312, 314.

The left and right stop zones 300, 302 are located to the front of and immediately to the sides of the truck 10. If an object is detected in either of the stop zones 300, 302 the controller 103 will initiate a brake operation to cause the truck 10 to stop.

Laterally outwardly from the stop zones 300, 302 are the left and right no steer zones 304, 306. The left and right no steer zones 304, 306 comprise forward and rear portions 304A, 306A and 304B, 306B. The forward portions 304A, 306A of the no steer zones 304, 306 may comprise scanned portions of the no steer zones 304, 306, i.e., portions of the no steer zones 304, 306 corresponding to the scanned zone 202, whereas the rear portions 304B, 306B of the no steer zones 304, 306 may comprise unscanned portions of the no steer zones 304, 306, i.e., portions of the no steer zones 304, 306 corresponding to the second portion 2040B of the history zone 204. If an object is detected in one of the no steer zones 304, 306, the controller 103 does not permit the vehicle to turn toward the no steer zone 304, 306 in which the object was detected until the object moves out of the respective no steer zone 304, 306.

Laterally outwardly from the no steer zones 304, 306 are the left and right steer zones 308, 310. The left and right steer zones 308, 310 comprise forward and rear portions 308A, 310A and 308B, 310B. The forward portions 308A, 310A of the steer zones 308, 310 may comprise scanned portions of the steer zones 308, 310, i.e., portions of the steer zones 308, 310 corresponding to the scanned zone 202, whereas the rear portions 308B, 310B of the steer zones 308, 310 may comprise unscanned portions of the steer zones 308, 310, i.e., portions of the steer zones 308, 310 corresponding to the second portion 2040B of the history zone 204. If an object is detected in one of the rear portions 308B, 310B of the steer zones 308, 310, the controller 103 permits the vehicle to turn toward the steer zone 308, 310 in which the object was detected, i.e., until the detected object enters the adjacent no steer zone 304, 306, at which point the controller 103 does not permit additional turning of the truck 10 toward the respective no steer zone 304, 306, and at which point the controller 103 may implement another steer maneuver as will be described herein. It is noted that, in the preferred embodiment, the controller 103 does not implement a steer maneuver to turn the truck 10 toward a steer zone 308, 310 if an object is detected in the forward portion 308A, 310A thereof, although the controller 103 could be programmed to implement such a steer maneuver.

Laterally outwardly from the steer zones 308, 310 are the left and right hug zones 312, 314. The hug zones 312, 314 are usable by the controller 103 to steer the truck 10 relative to selected objects such that the truck can be substantially maintained at a desired distance from the selected object, as will be described herein with reference to FIGS. 17A-17C. Laterally inner boundaries of the hug zones 312, 314 are defined by left and right hug lines 312A, 314A, as illustrated in FIGS. 16A-16C and 17A-17C.

Select ones of the action zones 280, or portions thereof, may be used by the controller 103 for implementing additional steer maneuvers. For example, the no steer zones 304, 306 and all or portions of the steer zones 308, 310 may define respective left and right steer away zones 316, 318. For example, the steer away zones 316, 318 may be defined by the no steer zones 304, 306 and the forward portions 308A, 310A but not the rear portions 308B, 310B of the steer zones 308, 310. If an object is detected in or otherwise determined to be located, e.g., via dead reckoning, in one of the steer away zones 316, 318 the truck 10 may turn away from the object, as long as another object is not located in the stop zone 302, 304, the no steer zone 304, 306, or the forward portion 308A, 310A of the steer zone 308, 310 on the opposite side of the truck 10. It is noted that the exemplary steer away zones 316, 318 described and illustrated herein could be defined by other action zones 280 or portions thereof.

The controller 103 may implement various steer maneuvers upon the happening of certain predefined conditions. A first exemplary event occurs when an object is detected within the scanned zone 202 by the obstacle sensor 76 and is determined to be within the left or right hug line 312A, 314A. If an object is detected within the scanned zone 202 and within the left or right hug line 312A, 314A, the controller 103 will attempt to steer the truck 10 away from the detected object, as long as such a steer maneuver is permitted, i.e., as long as a second object is not detected within the stop zone 302, 304, the no steer zone 304, 306, or the forward portion 308A, 310A of the steer zone 308, 310 on the opposite side of the truck 10.

A second exemplary event occurs when an object is detected or otherwise determined to be located, e.g., via dead reckoning, within a no steer zone 304, 306 and the object is located between the front edge 200A of the environment 200 and a predetermined axial location $L_5$ associated with the truck 10, see FIGS. 16A-16C. The predetermined location $L_5$ associated with the truck 10 may be defined, for example, at the axial location where the forks 16 extend from the truck 10. The predetermined axial location $L_5$ may alternatively be defined with respect to a predetermined distance from the front edge 200A of the environment 200. Upon the happening of the event according to this example, the controller 103 will attempt to steer away from the detected object, as long as such a steer maneuver is permitted, i.e., as long as a second object is not detected within the stop zone 302, 304, the no steer zone 304, 306, or the forward portion 308A, 310A of the steer zone 308, 310 on the opposite side of the truck 10.

A third exemplary event occurs when a first object is detected by the obstacle sensor 76 within the left hug line 312A and a second object is detected by the obstacle sensor 76 within the right hug line 314A. In this case, the controller 103 will implement a steer maneuver to maintain the truck 10 on a straight heading until one of the following occurs: one of the objects moves outside of the respective hug line 312A, 314A; one of the objects enters a rear portion 308B, 310B of a steer zone 308, 310; one of the objects leaves the environment 200; or one of the objects enters a stop zone 300, 302. Upon the occurrence of one of these instances, the controller 103 may implement another steer maneuver or initiate a brake operation depending on the location of the object(s).

A fourth exemplary event occurs when a "hug" maneuver is implemented by the controller 103. Additional details in connection with the hug maneuver will be described below with reference to FIGS. 17A-17C.

Referring to FIGS. 16A-16C in succession, exemplary steer maneuvers implemented by the controller 103 during movement of the truck 10 will be described. The truck 10 may be traveling in response to receiving a remote wireless travel request, i.e., from a wireless transmitter, as discussed in detail herein. Alternatively, the truck 10 may be coasting to a stop or may be driven manually by a rider or a walker who is walking alongside the truck 10.

In FIG. 16A, the obstacle sensor 76 detects first and second objects 272, 274 in the scanned zone 202. The obstacle sensor 76 sends sensor data to the controller 103 that includes information about the first and second objects 272, 274. The sensor data comprises data representative of which of the scan zones $202_{A1-A4}$, $202_{B1-B4}$ (see FIGS. 15A-15C) the objects 272, 274 are located in. The sensor data also includes data representative of a lateral distance that the objects 272, 274 are from the reference coordinate $R_C$, i.e., the central axis $C_A$ of the truck 10 in the embodiment shown.

In FIG. 16A, the laterally innermost portion of the first object 272 is determined to be in the scanned zone 202 and located outside of the left hug line 312A in the left hug zone 312, and the laterally innermost portion of the second object 274 is determined to be in the scanned zone 202 and located inside of the right hug line 314A in the forward portion 310A of the right steer zone 310. It is noted that, while a portion of the first object 272 is located outside of the left hug zone 312 and a portion of the second object 274 is located in the right hug zone 314, the controller 103 may be primarily concerned with the portion of any detected object that is closest laterally to the truck 10. Based on the object location information derived from the sensor data, it is determined that the laterally innermost portion of the second object 274 is closer than the laterally innermost portion of the first object 272 to the central axis $C_A$ of the truck 10. Based on the locations of the first and second objects 272, 274 in FIG. 16A, the controller 103 will automatically implement a steer maneuver to steer the truck 10 toward the first object 272, so as to steer the truck 10 away from the second object 274.

The truck 10 is continually steered toward the first object 272 and away from the second object 274 until one of two conditions occurs. The first condition is that the first object 272 (or another object determined to be in the environment 200) enters a predefined portion of the left action zone 282. The predefined portion of the left action zone 282 comprises a portion of the left action zone 282 wherein further steering of the truck 10 toward the first object 272 is determined to not be permitted. The predefined portion of the left action zone 282 in the exemplary embodiment shown is either of the forward portion 308A of the left steer zone 308 or the rear portion 304B of the left no steer zone 304, but could be other left action zones 282 or portions thereof. The second condition is that the second object 274 (and any other objects determined to be in the right action zone 284) completely exits a predefined portion of the right action zone 284. The predefined portion of the right action zone 284 comprises a portion of the right action zone 284 wherein further steering of the truck 10 away from the second object 274 is determined to not be required. The predefined portion of the right action zone 284 in the embodiment shown is the forward portion 310A of the right steer zone 310 if the second object 274 is in the scanned zone 202, i.e., such that the second object 274 is completely outside of the right hug line 314A, or the rear portion 306B of the right no steer zone 306 forward of the location $L_5$ if the second object 274 is in the second portion 2040B of the history zone 204, but could be other right action zones 284 or portions thereof.

In FIG. 16B, the first condition is illustrated as being met, i.e., the first object 272 enters the forward portion 308A of the left steer zone 308. While the first and second objects 272 and 274 are both in the scanned zone 202 such that they are being actively detected by the obstacle sensor 76, and while the laterally innermost portion of the first object 272 is in the forward portion 308A of the left steer zone 308 and the laterally innermost portion of the second object is in the forward portion 310A of the right steer zone 310, the controller 103 will implement a steer maneuver such that the truck 10 will maintain a straight heading. As noted above, the truck 10 will maintain a straight heading until one of the following occurs: the laterally innermost portion of one of the objects 272, 274 moves outside of a hug line 312A, 314A; the laterally innermost portion of one of the objects 272, 274 enters a rear portion 308B, 310B of a steer zone 308, 310; or one of the objects leaves the environment 200.

In FIG. 16C, the laterally innermost portion of the second object 274 is illustrated as having moved into the rear portion 310B of the right steer zone 310. In this scenario, the second object 274 has gone from being scanned by the obstacle sensor 76 in the scanned zone 202 to not being scanned in the second portion 2040B of the history zone 204, and, thus, being tracked by dead reckoning. Since the laterally innermost portion of first object 272 is in the forward portion 308A of the left steer zone 308 and the second object 274 is in the rear portion 310B of the right steer zone 310, the controller 103 automatically implements a steer maneuver to steer the truck 10 away from the first object 272 so as to steer the truck 10 toward the second object 274. The truck 10 will continue to steer away from the first object 272 and toward the second object 274 until one of the following exemplary conditions occurs: the laterally innermost portion of the first object 272 enters the rear portion 308B of the left steer zone 308; the first object 272 is located completely outside of the left hug line 312A; or until an object is determined to be in the right no steer zone 306 or the forward portion 310A of the right steer zone 310. If one of these events occurs, the controller 103 may implement a subsequent steer maneuver as described herein.

If at any time during operation the first and/or second object 272, 274 enter one of the stop zones 300, 302, the controller 103 will initiate a brake operation to cause the truck 10 to stop, as discussed above.

Figure 17B:
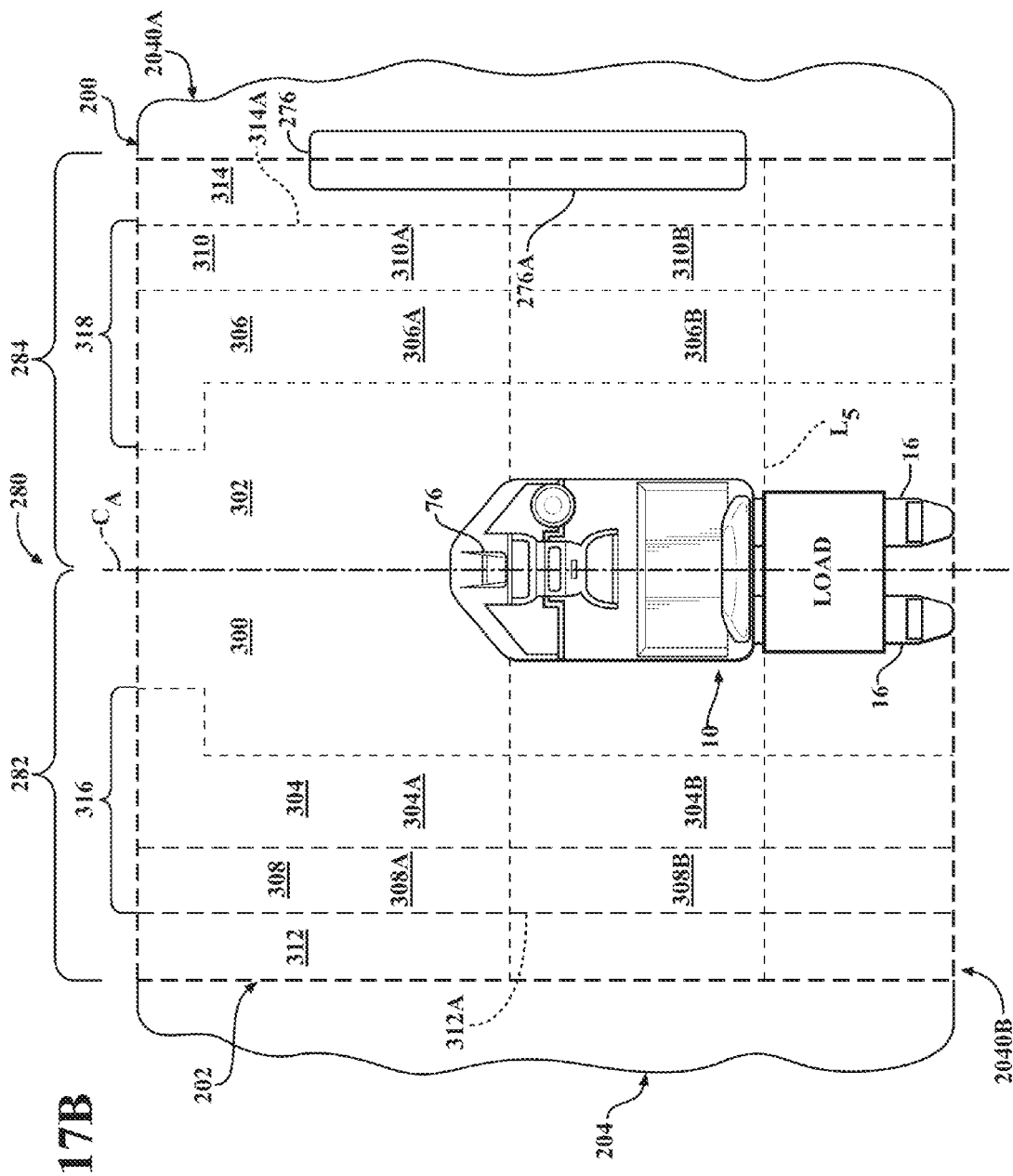
Figure 17C:
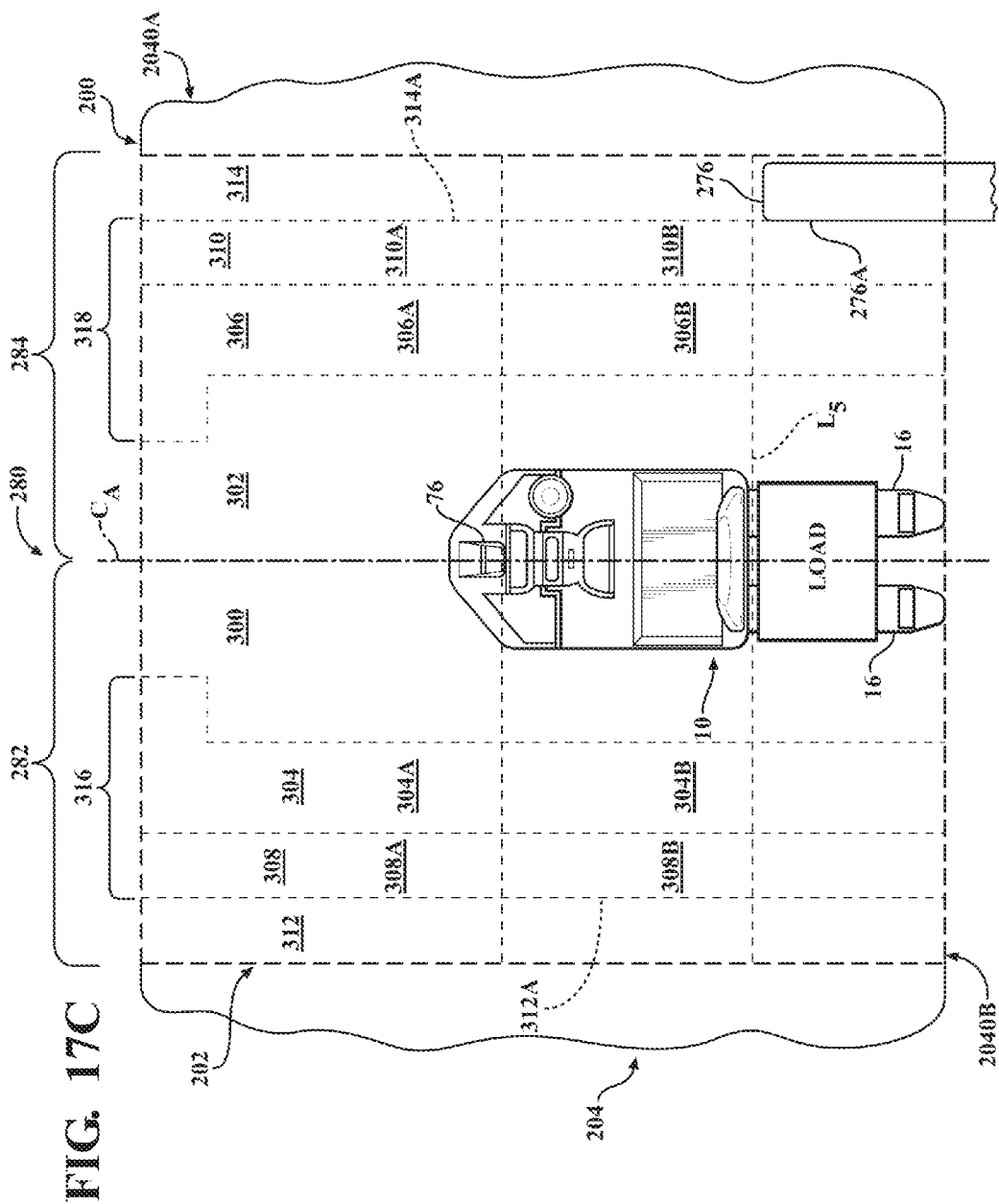

FIGS. 17A-17C are successive views of a truck 10 performing steer maneuvers according to another aspect of the invention. FIGS. 17A-17C will be discussed in terms of the action zones 280 discussed above with reference to FIGS. 16A-16C. The truck 10 may be traveling in response to receiving a remote wireless travel request, i.e., from a wireless transmitter, as discussed in detail herein. Alternatively, the truck 10 may be coasting to a stop or may be driven manually by a rider or a walker who is walking alongside the truck 10.

In FIG. 17A, the obstacle sensor 76 detects a selected object 276 in the scanned zone 202. The obstacle sensor 76 sends sensor data to the controller 103 that includes information about the selected object 276. The sensor data comprises data that is representative of which of the scan zones $202_{A1-A4}$, $202_{B1-B4}$ (see FIGS. 15A-15C) the selected object 276 is located in. The sensor data also includes data representative of the lateral distance that the selected object 276 is from the reference coordinate $R_C$, i.e., the central axis $C_A$ of the truck 10 in the embodiment shown. The selected object 276 may be a rack or a stacked product face having a generally axially extending laterally inner edge portion 276A, although it is understood that the selected object 276 could be other objects.

In the environment 200 illustrated in FIG. 17A, based on the sensor data from the obstacle sensor 76, it is determined that the edge portion 276A of the selected object 276 is in the right steer zone 310. Based on the detected location of the selected object 276 illustrated in FIG. 17A, the controller 103 automatically implements a steer maneuver to steer the truck 10 away from the selected object 276 with the intent of steering the truck 10 such that the truck 10 is substantially maintained at a desired distance from the edge portion 276A of the selected object 276, i.e., such that the truck 10 "hugs" the edge portion 276A of the selected object 276. In one embodiment, the intent of the steer maneuver may be such that the selected object 276 is at least partially maintained in the right hug zone 314. Additionally or alternatively, the intent of the steer maneuver may be such that a portion of the selected object 276, e.g., the edge portion 276A thereof, is substantially maintained on the right hug line 314A that is associated with the right hug zone 314.

In the exemplary embodiment shown, the intent of the steer maneuver is to continually steer the truck 10 away from the selected object 276 until the selected object 276 is at least partially maintained in the right hug zone 314 and until the edge portion 276A of the selected object 276 is substantially maintained on the right hug line 314A.

Referring to FIG. 17B, an exemplary condition is illustrated wherein the truck 10 "overshot" the right hug line 314A, such that the edge portion 276A of the selected object 276 went past the right hug line 314A. In this case, the controller 103 automatically implements a steer maneuver to steer the truck 10 toward the selected object 276 until the edge portion 276A of the selected object 276 is maintained on the right hug line 314A. It is noted that, since no portion of the selected object 276 is located in the right no steer zone 306 or in the forward portion 310A of the right steer zone 310 in FIG. 17B, the truck 10 is permitted to turn toward the selected object 276.

In FIG. 17C, after the steer maneuver is implemented that steers the truck 10 toward the selected object 276 such that the edge portion 276A of the selected object 276 is positioned on the right hug line 314A, the controller 103 implements a steer maneuver to achieve a straight heading of the truck 10 in the axial direction, i.e., parallel to the central axis $C_A$, so as to maintain the edge portion 276A of the selected object 276 on the right hug line 314A. The truck 10 continues to travel straight until the selected object 276 is no longer determined to be in the environment 200, or until the edge portion 276A of the selected object 276 is no longer determined to be located on the right hug line 314A, at which point the controller 103 could implement a steer maneuver such that the right hug line 314A coincides with the edge portion 276A of the selected object 276.

According to one embodiment, if multiple objects are located within the environment 200, the selected object 276 may be an object that is determined to be located closest to the left hug line 312A or the right hug line 314A. Alternatively, the selected object 276 may be the first object that is detected in the scanned zone 202 by the obstacle sensor 76, or may be the first object that is determined to be in at least one of the steer zones 308, 310 and the no steer zones 304, 306. As another example, the selected object 276 may be an object that is determined to be the closest object to the truck 10 within the environment 200, as measured in the lateral direction.

Further, the controller 103 may be programmable to only perform a steer maneuver to "hug" a selected object if the object is detected in a select one of the left and right hug zones 312, 314. For example, it may be desirable that the truck 10 only hug objects located on the right side of the truck 10. Under this arrangement, the truck 10 may travel in a controlled fashion down the right side of an aisle, while another truck travels in the opposite direction on the other side of the aisle. As another example, if an operator will only be picking items located on the right side of an aisle, the truck 10 may only hug a rack or stacked product face on the right side of the truck 10, so as to minimize the distance that the operator has to walk from the rack to the truck 10.

Further still, the hug maneuver described herein may be implemented by the controller 103 in one embodiment only upon authorization to do so. For example, an operator may depress a button, which button may be located on the truck 10 or on a remote control device as described herein. Upon receiving authorization to implement a hug maneuver, the controller 103 enters into an "acquire hug" mode, wherein the controller 103 looks for objects in the scanned zone 202 to hug. Additionally, the operator may designate hug preferences, such as whether to hug an object on the left or right side of the truck 10, the first object detected in the scanned zone 202, the object that is determined to be located closest to the central axis $C_A$ of the truck 10, etc. Additionally, once an object that is being hugged is no longer located within the environment 200, the truck may continue forward on a straight heading until a new object to hug is detected by the obstacle sensor 76. If a new object is detected by the obstacle sensor 76 within the environment 200, the controller 103 may be programmed to automatically hug the new object, or the controller 103 may need to be authorized to do so by the operator.

Moreover, the hug maneuvers used in connection with the hug zones 312, 314 described herein with reference to FIGS. 17A-17C may be used in combination with the other action zones 280 described above with reference to FIGS. 16A-16C.

Having thus described the invention of the present application in detail and by reference to embodiments thereof, it will be apparent that modifications and variations are possible without departing from the scope of the invention defined in the appended claims.

What is claimed is:

1. A method for a materials handling vehicle to implement a steer maneuver comprising:
   receiving sensor data from at least one sensing device by a controller on a materials handling vehicle;
   detecting that a selected object is in an environment proximate the vehicle, the environment comprising:
   a hug zone displaced laterally from the left or right side of the vehicle;
   a stop zone laterally inwardly from the hug zone, wherein if an object is detected in at least a portion of the stop zone the vehicle is caused to initiate a braking operation;
   a no steer zone laterally outwardly from the stop zone, wherein if an object is detected in at least a portion of the no steer zone the vehicle is not permitted to turn toward the no steer zone; and
   a steer zone located laterally between the no steer zone and the hug zone, wherein if an object is detected in at least a portion of the steer zone the vehicle is permitted to turn toward the steer zone as long as no portion of the object is located in the no steer zone; and
   performing a steer maneuver by the controller causing the vehicle to steer such that the vehicle is substantially maintained at a desired distance from the selected object, wherein the desired distance is maintained between the vehicle and the selected object as the vehicle travels on a desired heading.

2. The method of claim 1, wherein performing a steer maneuver comprises the controller automatically steering the vehicle such that the selected object is at least partially maintained in the hug zone.

3. The method of claim 2, wherein performing a steer maneuver further comprises steering the vehicle such that at least a portion of the selected object is substantially maintained on a hug line associated with the hug zone.

4. The method of claim 3, wherein:
   if a laterally innermost portion of the selected object is located laterally between the hug line and the vehicle, the vehicle is automatically steered away from the selected object until the laterally innermost portion of the selected object is located on the hug line, at which point the vehicle is automatically steered to the desired heading; and
   if the laterally innermost portion of the selected object is located laterally on the other side of the hug line than the vehicle, the vehicle is automatically steered toward the selected object until the laterally innermost portion of the selected object is located on the hug line, at which point the vehicle is automatically steered to the desired heading.

5. The method of claim 2, wherein:
   the hug zone extends in an axial direction that is parallel to a central axis of the vehicle and the hug zone is laterally displaced from a side of the vehicle; and
   the desired heading is substantially in the axial direction.

6. The method of claim 1, wherein the environment comprises first and second hug zones, the first hug zone displaced laterally from the left side of the vehicle and the second hug zone displaced from the right side of the vehicle.

7. The method of claim 6, wherein the environment further comprises:
   first and second stop zones laterally inwardly from the respective first and second hug zones, wherein if an object is detected in a stop zone, the vehicle is caused to initiate a braking operation;
   first and second no steer zones laterally outwardly from the respective stop zones, wherein if an object is detected in at least a portion of a no steer zone the vehicle is not permitted to turn toward the no steer zone in which the object was detected; and
   first and second steer zones laterally between the respective no steer zones and the respective hug zones, wherein if an object is detected in at least a portion of a steer zone the vehicle is permitted to turn toward the steer zone in which the object was detected as long as no portion of the object is located in the corresponding no steer zone.

8. The method of claim 7, wherein the selected object is the first object that is detected in at least one of the steer zones and the no steer zones.

9. The method of claim 6, wherein the controller is programmable to only perform a steer maneuver if an object is detected in a select one of the first and second hug zones.

10. The method of claim 1, wherein detecting that a selected object is in an environment proximate the vehicle comprises detecting that the selected object is in a scanned zone of the environment, wherein the scanned zone is scanned by the at least one sensing device.

11. The method of claim 1, wherein the selected object is an object that is determined to be the closest object to the vehicle within the environment, as measured in a lateral direction that is perpendicular to a central axis of the vehicle.

12. The method of claim 1, wherein the selected object is the first object that is detected in a scanned zone defined in the environment, wherein the scanned zone is scanned by the at least one sensing device.

13. The method of claim 1, wherein the selected object comprises one of a stationary wall, a stationary rack, and a stationary stacked product face having a generally axially extending edge portion such that the vehicle is substantially maintained at a desired distance from the edge portion of the wall, rack, or stacked product face.

14. The method of claim 1, wherein performing a steer maneuver comprises the controller causing the vehicle to steer such that the vehicle is substantially maintained at a desired distance from the selected object as the vehicle travels on a desired heading until a predetermined event occurs, the predetermined event comprising at least one of;
the selected object leaving the hug zone;
the selected object leaving the environment; and
a second object entering a predefined portion of the steer zone.

15. The method of claim 1, wherein performing a steer maneuver is implemented by the controller upon authorization to do so by an operator.

16. The method of claim 15, wherein the operator designates whether to substantially maintain the vehicle at a desired distance from an object on the left or right side of the vehicle.

17. The method of claim 16, wherein the operator authorizes a steer maneuver by activating structure on the vehicle or on a remote control device associated with the vehicle.

18. The method of claim 17, wherein the operator activating structure comprises the operator depressing a button located either on the vehicle or on the remote control device.

19. The method of claim 1, wherein performing a steer maneuver comprises:
if the selected object is located outside of a zone or line defined within the environment, the vehicle is automatically steered such that the selected object is at least partially located in the zone or on the line, at which point the vehicle is automatically steered to the desired heading while maintaining the desired distance from the selected object.

20. A method for a materials handling vehicle to implement a steer maneuver comprising:
receiving sensor data from at least one sensing device by a controller on a materials handling vehicle;
detecting that a selected object is in an environment proximate the vehicle; and
performing a steer maneuver by the controller causing the vehicle to steer such that the vehicle is substantially maintained at a desired distance from the selected object, wherein the selected object is an object that is determined to be the closest object to the vehicle within the environment, as measured in a lateral direction that is perpendicular to a central axis of the vehicle.

21. The method of claim 20, wherein performing a steer maneuver comprises the controller causing the vehicle to steer such that the vehicle is substantially maintained at a desired distance from the selected object until a predetermined event occurs, wherein the predetermined event comprises at least one of:
the selected object leaving a hug zone defined within the environment;
the selected object leaving the environment; and
a second object entering a predefined portion of a steer zone defined within the environment.

22. The method of claim 20, wherein performing a steer maneuver comprises the controller automatically steering the vehicle such that the selected object is at least partially maintained in a hug zone defined within the environment.

23. The method of claim 22, wherein the hug zone extends in an axial direction that is parallel to a central axis of the vehicle and the hug zone is laterally displaced from a side of the vehicle.

24. The method of claim 20, wherein performing a steer maneuver further comprises steering the vehicle such that at least a portion of the selected object is substantially maintained on a hug line associated with the vehicle.

25. The method of claim 24, wherein:
if a laterally innermost portion of the selected object is located laterally between the hug line and the vehicle, the vehicle is automatically steered away from the selected object until the laterally innermost portion of the selected object is located on the hug line, at which point the vehicle is automatically steered to a desired heading; and
if the laterally innermost portion of the selected object is located laterally on the other side of the hug line than the vehicle, the vehicle is automatically steered toward the selected object until the laterally innermost portion of the selected object is located on the hug line, at which point the vehicle is automatically steered to the desired heading.

26. The method of claim 25, wherein the desired heading is substantially in an axial direction that is parallel to a central axis of the vehicle.

27. The method of claim 20, wherein the environment comprises first and second hug zones, the first hug zone displaced laterally from the left side of the vehicle and the second hug zone displaced from the right side of the vehicle.

28. The method of claim 27, wherein the environment further comprises:
first and second stop zones laterally inwardly from the respective first and second hug zones, wherein if an object is detected in a stop zone, the vehicle is caused to initiate a braking operation;
first and second no steer zones laterally outwardly from the respective stop zones, wherein if an object is detected in at least a portion of a no steer zone the vehicle is not permitted to turn toward the no steer zone in which the object was detected; and
first and second steer zones laterally between the respective no steer zones and the respective hug zones, wherein if an object is detected in at least a portion of a steer zone the vehicle is permitted to turn toward the steer zone in which the object was detected as long as no portion of the object is located in the corresponding no steer zone.

29. The method of claim 27, wherein the controller is programmable to only perform a steer maneuver if an object is detected in a select one of the first and second hug zones.

30. The method of claim 20, wherein detecting that a selected object is in an environment proximate the vehicle comprises detecting that the selected object is in a scanned zone of the environment, wherein the scanned zone is scanned by the at least one sensing device.

31. The method of claim 20, wherein the selected object comprises one of a stationary wall, a stationary rack, and a stationary stacked product face having a generally axially extending edge portion such that the vehicle is substantially maintained at a desired distance from the edge portion of the wall, rack, or stacked product face.

32. The method of claim 20, wherein performing a steer maneuver is implemented by the controller upon authorization to do so by an operator.

33. The method of claim 32, wherein the operator authorizes a steer maneuver by activating structure on the vehicle or on a remote control device associated with the vehicle.

34. The method of claim 33, wherein the operator activating structure comprises the operator depressing a button located either on the vehicle or on the remote control device.

35. The method of claim 33, wherein the operator designates whether to substantially maintain the vehicle at a desired distance from an object on the left or right side of the vehicle.

36. The method of claim 20, wherein performing a steer maneuver comprises:

if the selected object is located outside of a zone or line defined within the environment, the vehicle is automatically steered such that the selected object is at least partially located in the zone or on the line, at which point the vehicle is automatically steered to the desired heading while maintaining the desired distance from the selected object.

37. A method for a materials handling vehicle to implement a steer maneuver comprising:
   receiving sensor data from at least one sensing device by a controller on a materials handling vehicle;
   detecting that a selected object is in an environment proximate the vehicle;
   in response to an operator initiated request, performing a steer maneuver by the controller causing the vehicle to steer such that the vehicle is substantially maintained at a desired distance from the selected object, wherein the operator designates whether to substantially maintain the vehicle at a desired distance from an object on the left or right side of the vehicle.

38. The method of claim 37, wherein performing a steer maneuver comprises the controller steering the vehicle such that the selected object is at least partially maintained in a hug zone defined within the environment, the hug zone extending in an axial direction that is parallel to a central axis of the vehicle and the hug zone is laterally displaced from a side of the vehicle.

39. The method of claim 38, wherein performing a steer maneuver further comprises steering the vehicle such that at least a portion of the selected object is substantially maintained on a hug line associated with the hug zone.

40. The method of claim 39, wherein:
   if a laterally innermost portion of the selected object is located laterally between the hug line and the vehicle, the vehicle is automatically steered away from the selected object until the laterally innermost portion of the selected object is located on the hug line, at which point the vehicle is automatically steered to a desired heading; and
   if the laterally innermost portion of the selected object is located laterally on the other side of the hug line than the vehicle, the vehicle is automatically steered toward the selected object until the laterally innermost portion of the selected object is located on the hug line, at which point the vehicle is automatically steered to the desired heading.

41. The method of claim 40, wherein the desired heading is substantially in an axial direction that is parallel to a central axis of the vehicle.

42. The method of claim 37, wherein the environment comprises first and second hug zones, the first hug zone displaced laterally from the left side of the vehicle and the second hug zone displaced from the right side of the vehicle.

43. The method of claim 42, wherein the environment further comprises:
   first and second stop zones laterally inwardly from the respective first and second hug zones, wherein if an object is detected in a stop zone, the vehicle is caused to initiate a braking operation;
   first and second no steer zones laterally outwardly from the respective stop zones, wherein if an object is detected in at least a portion of a no steer zone the vehicle is not permitted to turn toward the no steer zone in which the object was detected; and
   first and second steer zones laterally between the respective no steer zones and the respective hug zones, wherein if an object is detected in at least a portion of a steer zone the vehicle is permitted to turn toward the steer zone in which the object was detected as long as no portion of the object is located in the corresponding no steer zone.

44. The method of claim 43, wherein the selected object is the first object that is detected in at least one of the steer zones and the no steer zones.

45. The method of claim 37, wherein detecting that a selected object is in an environment proximate the vehicle comprises detecting that the selected object is in a scanned zone of the environment, wherein the scanned zone is scanned by the at least one sensing device.

46. The method of claim 37, wherein the selected object is an object that is determined to be the closest object to the vehicle within the environment, as measured in a lateral direction that is perpendicular to a central axis of the vehicle.

47. The method of claim 37, wherein the selected object is the first object that is detected in a scanned zone defined in the environment, wherein the scanned zone is scanned by the at least one sensing device.

48. The method of claim 37, wherein the selected object comprises one of a stationary wall, a stationary rack, and a stationary stacked product face having a generally axially extending edge portion such that the vehicle is substantially maintained at a desired distance from the edge portion of the wall, rack, or stacked product face.

49. The method of claim 37, wherein the operator authorizes a steer maneuver by activating structure on a remote control device associated with the vehicle.

50. The method of claim 49, wherein the operator activating structure comprises the operator depressing a button located on the remote control device.

51. The method of claim 37, wherein performing a steer maneuver comprises the controller causing the vehicle to steer such that the vehicle is substantially maintained at a desired distance from the selected object until a predetermined event occurs, the predetermined event comprising at least one of:
   the selected object leaving a hug zone defined within the environment;
   the selected object leaving the environment; and
   a second object entering a predefined portion of a steer zone defined within the environment.

52. The method of claim 37, wherein performing a steer maneuver comprises:
   if the selected object is located outside of a zone or line defined within the environment, the vehicle is automatically steered such that the selected object is at least partially located in the zone or on the line, at which point the vehicle is automatically steered to the desired heading while maintaining the desired distance from the selected object.

53. A method for a materials handling vehicle to implement a steer maneuver comprising:
   receiving sensor data from at least one sensing device by a controller on a materials handling vehicle;
   detecting that a selected object is in an environment proximate the vehicle; and
   performing a steer maneuver by the controller causing the vehicle to steer such that the vehicle is substantially maintained at a desired distance from the selected object, wherein if the selected object is located outside of a hug zone or hug line defined within the environment, the vehicle is automatically steered such that the selected object is at least partially located in the hug zone or on the hug line, at which point the vehicle is automatically steered to the desired heading while maintaining the desired distance from the selected object.

54. A method for a materials handling vehicle to implement a steer maneuver comprising:
receiving sensor data from at least one sensing device by a controller on a materials handling vehicle;
detecting that a selected object is in an environment proximate the vehicle, the environment including first and second hug zones, the first hug zone displaced laterally from the left side of the vehicle and the second hug zone displaced laterally from the right side of the vehicle; and
performing a steer maneuver by the controller causing the vehicle to steer such that the vehicle is substantially maintained at a desired distance from the selected object as the vehicle travels on a desired heading, wherein the controller is programmable to only perform a steer maneuver if an object is detected in a select one of the first and second hug zones.

55. The method of claim 54, wherein performing a steer maneuver comprises the controller steering the vehicle such that the selected object is at least partially maintained in the select one of the first and second hug zones.

56. The method of claim 55, wherein performing a steer maneuver further comprises steering the vehicle such that at least a portion of the selected object is substantially maintained on a hug line associated with the select one of the first and second hug zones.

57. The method of claim 56, wherein:
if a laterally innermost portion of the selected object is located laterally between hug line and the vehicle, the vehicle is automatically steered away from the selected object until the laterally innermost portion of the selected object is located on the hug line, at which point the vehicle is automatically steered to a desired heading; and
if the laterally innermost portion of the selected object is located laterally on the other side of the hug line than the vehicle, the vehicle is automatically steered toward the selected object until the laterally innermost portion of the selected object is located on the hug line, at which point the vehicle is automatically steered to the desired heading.

58. The method of claim 54, wherein the environment further comprises:
first and second stop zones laterally inwardly from the respective first and second hug zones, wherein if an object is detected in a stop zone, the vehicle is caused to initiate a braking operation;
first and second no steer zones laterally outwardly from the respective stop zones, wherein if an object is detected in at least a portion of a no steer zone the vehicle is not permitted to turn toward the no steer zone in which the object was detected; and
first and second steer zones laterally between the respective no steer zones and the respective hug zones, wherein if an object is detected in at least a portion of a steer zone the vehicle is permitted to turn toward the steer zone in which the object was detected as long as no portion of the object is located in the corresponding no steer zone.

59. The method of claim 54, wherein the operator authorizes a steer maneuver by activating structure on a remote control device associated with the vehicle.

60. The method of claim 59, wherein the operator activating structure comprises the operator depressing a button located on a remote control device associated with the vehicle.

* * * * *